US007117161B2

(12) United States Patent
Bruce

(10) Patent No.: US 7,117,161 B2
(45) Date of Patent: Oct. 3, 2006

(54) DECISION DYNAMICS

(76) Inventor: Elisa M. Bruce, 6026B Curtier Dr., Alexandria, VA (US) 22310

( * ) Notice: Subject to any disclaimer, the term of this patent is extended or adjusted under 35 U.S.C. 154(b) by 973 days.

(21) Appl. No.: 09/819,975

(22) Filed: Mar. 29, 2001

(65) Prior Publication Data

US 2002/0049621 A1    Apr. 25, 2002

Related U.S. Application Data

(60) Provisional application No. 60/226,576, filed on Aug. 21, 2000.

(51) Int. Cl.
G06Q 10/00    (2006.01)
(52) U.S. Cl. .................................. 705/8; 705/7; 705/10
(58) Field of Classification Search ............... 705/7–10
See application file for complete search history.

(56) References Cited

U.S. PATENT DOCUMENTS

| | | | |
|---|---|---|---|
| 5,128,860 A | | 7/1992 | Chapman |
| 5,237,497 A | | 8/1993 | Sitarski |
| 5,255,181 A | * | 10/1993 | Chapman et al. ............... 705/8 |
| 5,291,394 A | | 3/1994 | Chapman |
| 5,295,065 A | | 3/1994 | Chapman et al. |
| 5,321,605 A | | 6/1994 | Chapman et al. |
| 5,331,545 A | | 7/1994 | Yajima et al. |
| 5,586,021 A | | 12/1996 | Fargher et al. |
| 5,630,069 A | * | 5/1997 | Flores et al. .................... 705/7 |
| 5,655,118 A | | 8/1997 | Heindel et al. |
| 5,671,361 A | | 9/1997 | Brown et al. |
| 5,675,745 A | | 10/1997 | Oku et al. |
| 5,715,181 A | * | 2/1998 | Horst ........................ 702/180 |
| 5,717,865 A | | 2/1998 | Stratmann |
| 5,745,652 A | | 4/1998 | Bigus |
| 5,774,866 A | | 6/1998 | Horwitz et al. |
| 5,799,286 A | | 8/1998 | Morgan et al. |
| 5,826,252 A | | 10/1998 | Wolters, Jr. et al. |
| 5,930,762 A | | 7/1999 | Masch |
| 6,038,543 A | | 3/2000 | Kurosawa |

(Continued)

FOREIGN PATENT DOCUMENTS

WO    WO 00/20939    *    4/2000

OTHER PUBLICATIONS

"Network Capacity Management," Capacity Management Review, Mar. 1992 [retrieved from Proquest].*

(Continued)

Primary Examiner—Tariq R. Hafiz
Assistant Examiner—Catherine M. Colón
(74) Attorney, Agent, or Firm—Armstrong, Kratz, Quintos, Hanson & Brooks, LLP

(57) ABSTRACT

The invention is a method and a system for analyzing a process in terms of the elements that are the drivers of the process. The invention evaluates a process in terms of one or more scheduling drivers and process drivers, measures the metrics around the drivers and relates the measured values to key performance indicators of the drivers and the overall process. The metrics of the drivers can be correlated to past performance to determine if the attributes of the drivers being measures should be changed. The invention is appropriate for evaluating the processes of an business organization where the processes can be defined by one of the five process flows of the invention.

12 Claims, 28 Drawing Sheets

U.S. PATENT DOCUMENTS

| | | | |
|---|---|---|---|
| 6,047,264 A | 4/2000 | Fisher et al. | |
| 6,336,138 B1* | 1/2002 | Caswell et al. | 709/223 |
| 6,345,259 B1* | 2/2002 | Sandoval | 705/7 |
| 6,415,196 B1* | 7/2002 | Crampton et al. | 700/100 |
| 6,609,100 B1* | 8/2003 | Smith et al. | 705/8 |
| 6,738,736 B1* | 5/2004 | Bond | 703/2 |

OTHER PUBLICATIONS

Papke-Shields, Karen Elizabeth. "Strategic manufacturing planning: Examining the relationship between planning system design, manufacturing context, and planning effectiveness," University of South Carolina, 1997 [retrieved from Proquest].*

* cited by examiner

Fig.9

```
                    EXERCISE RELATIVE TO BODY SYSTEMS (29)
                    ┌─────────────────────────────────────┐
EXERCISE            │  TYPES OF EXERCISE       (31)       │
────────────────────┤                                     │
                    │                                     │
                    │  EXERCISE RELATIVE TO INPUTS  (35)  │
                    └─────────────────────────────────────┘
```

Fig.10

| τ | EXERCISE RELATIVE TO BODY SYSTEM | | |
|---|---|---|---|
| | CARDIOVASCULAR<br>R<br><br>M | RESPIRATORY<br>R<br><br>M | MUSCULAR<br>R<br><br>M |

3b

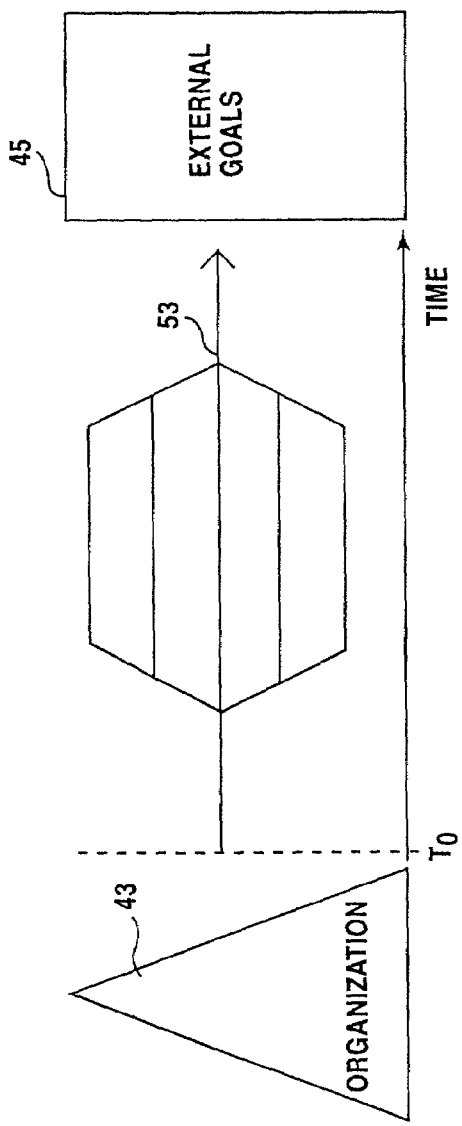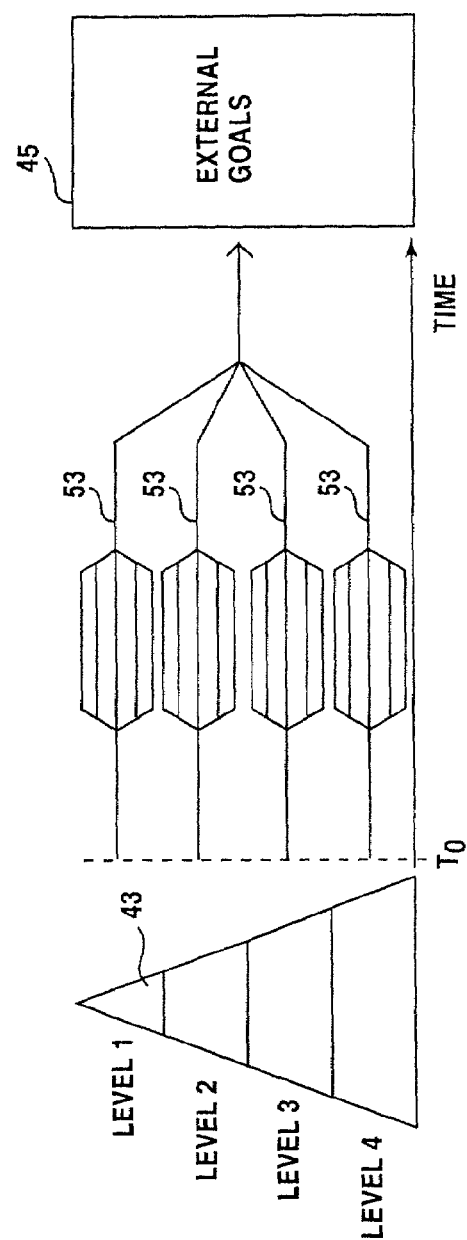

DECISION DYNAMICS

This application claims priority from provisional application Ser. No. 60/226,576, filed Aug. 21, 2000.

BACKGROUND OF THE INVENTION

1. Technical Field

The field of the invention relates to a strategic, planning and controlling method for industry and a data collecting and tracking means thereof and more specifically to a method for analyzing an organization, its process drivers, its resources, its input and output entities and the risks and opportunities of a plurality of on-going projects of the organization, so that its processes can be controlled to achieve the desired goals of the organization.

2. Background Art

Conventional costing and management decision support systems use traditional profit and loss statements to analyze costs such as salaries, equipment, facilities, and administrative expenses. Based on these figures, business managers use direct material and labor consumption as the primary means of determining product costs and sale prices, and apportioning overhead costs. This method has been adequate when the overhead and administrative cost of activities, not directly related to production, was small compared with the direct material and labor required to manufacture the end product. However, in today's service businesses and manufacturing environments, automation has substantially reduced the amount of direct material and labor consumption, so that indirect activities have become a significant factor contributing to the cost of making the product. The result of conventional systems can give business managers an inaccurate view of how the business organization spends money, which may cause them to make pricing errors, mis-allocate resources, and make strategic mistakes.

In today's economy, information and intangible assets are of greater significance to businesses than in the past when physical assets were the almost the total measure of a business. Therefore new methods need to be developed so the effect of information and intangible assets on a business can be measured just as physical assets were measured.

The popular prior art way of viewing an organization's operations is to associate costs with activities. Activity-based costing measures the cost and performance of activities and products. In product costing applications, for example, activity-based costing allows costs to be apportioned to products by the activities and resources consumed in procuring parts or materials, manufacturing, marketing, selling, delivering, and servicing the product. With activity-based costing information, managers can be provided with a different gauge of the business operations.

An example of an activity-based management system is found in U.S. Pat. No. 5,799,286 (1998) to Morgan et al. The focus of the system is defining the operation of an organization in terms of the activities it performs. In an activity-based system, the production activities are isolated and information is acquired which is relevant mainly to the specific activities.

For example U.S. Pat. No. 5,799,286 describes an automated activity-based management system for a business organization occupying facilities, employing people and using equipment to produce products and provide services is provided. The system includes a database which receives traditional accounting information and accepts information related to activities provided by the users. The activity information includes the activities performed, the percentage of time each activity is performed, equipment utilization data, and space utilization data. Further included is a people module for processing the traditional accounting information and activity information to generate a people cost component associated with each activity. A facilities module processes the traditional accounting information and activity information and generates a facilities cost component associated with each activity. An equipment module processes the traditional accounting information and activity information and generates an equipment cost component associated with each activity. An overhead module is also provided to process the traditional accounting information and activity information to generate an overhead cost component associated with each activity. A reporting module generates cost summaries of the activities.

Based on the above information, a people cost component, a facilities cost component, an equipment cost component, and an overhead cost component associated with each activity are computed. Based on the activity costs and the output resulting from the activities, the value of activities performed by an organization are determined. According to the activity costs, the activities can be prioritized to emphasize valuable activities and de-emphasize or eliminate wasteful or unnecessary activities. Resources such as facilities and equipment can also be utilized.

Other prior art management methods include methods for planning business systems having specific work, project or scheduling patterns, like production and manufacturing or project management. For example there are many prior art methods for optimizing the manufacturing method in a factory. In order to configure a production plan which yields the best performance, the capacity, or the amount of work the facility can handle, must be modeled in some fashion, since starting work above the capacity of the facility compromises performance and brings forth no benefits. Conventional factory capacity models employ simple steady-state linear relations that include: (1) the average amount of available work time for each machine in the factory and (2) the amount of work each product requires of each machine. From the above linear relations, a given start plan is within capacity if, for each machine, the total required amount of work is: (1) less than the machine's available time, and (2) multiplied by a predetermined fraction goal utilization of the start rate.

U.S. Pat. No. 5,586,021 (1996) to Farger et al. is a modification of the conventional capacity model above. In U.S. Pat. No. 5,586,021 the production plan is represented by the processing capacity of each resource group in the factory, divided into contiguous time intervals, together with the work planned for each time interval. Work is represented within time intervals by the total processing committed by each resource group. No sequencing of work is performed within a time interval. This may be referred to as a 'time-phased' model.

Each job to be planned, which may have an estimated total cycle time of many time intervals, is represented by first dividing the required processing into discrete segments, where each segment represents processing on resources which may be completed within one time interval of the plan representation. Division of processing into segments is performed by calculating which segment each processing step would lie in if processing were evenly distributed over the entire cycle time. This model is still an activity based model because it focuses on the individual jobs or activities to be performed.

For project planning, U.S. Pat. No. 5,826,252 (1998) to Wolters, Jr. et al. describes a system for managing multiple projects of a similar type. It has a global project management database for storing data for all participating projects which is dynamically updated with best current data representing best current practices across all participating projects in the system. Localized computer terminals are operated at each local site with a common project management program and data imported from the global project management database. Periodically, the local terminals export data to the global project management database which are evaluated to determine any new best current practices across all participating projects and to update the global project management database with the new best current practices. Upon periodically importing data from the global project management database, each localized computer terminal is updated with the new best current practices across all participating projects.

Finally, U.S. Pat. No. 5,255,181 (1993) to Chapman et al. describes a method of planning organizational activities based on a prioritizing system using a simulator. The method maintains a time-valued list of existing commitments to resources. Allocations of these resources are made to lots during a simulation procedure which calculates a resulting plan's timing data. The method simulates higher priority lots before it simulates lower priority lots. A simulation evaluates the process flow description to obtain the relative order of consuming and releasing resources, resource attributes and related capabilities, initial minimum timing requests, and process control rules. The simulation uses the list to determine when resources may be used without impacting prior commitments of the resources. In addition, the simulation forces the allocations to conform to the process control rules. The resulting timing data is merged into the processing plan, and resource commitments are then made to the simulated resource. When lower priority lots are simulated, commitments have already been made to higher priority lots. Thus, the lower priority lots cannot receive resource allocations which impact the higher priority lots.

As shown above the prior art methods focus on small snap shots of an organization such as an activity (project) or activities or resource allocation among activities. Optimizing particular activities may be beneficial, but it does not necessarily result in the optimization of the entire organization. Without an accurate model, an organization is still a black box.

Other solutions for management decision support are currently known as project management, business intelligence and data mining.

Project management is a term used to describe the process of designing and monitoring a project based on a work breakdown structure (WBS) and task assignments for staffing resources over time. The project manager determines the deliverables or goals for the project. These goals are broken down into tasks and possibly sub-tasks. Each task maybe dependent or non-dependent on any number of other tasks to be completed. The division of a large project into a plurality of groups of dependent tasks and non-dependent tasks is called the WBS. Next, each task is assigned to a selection of staffing resource(s). This assignment ensures work balancing (avg. of 40 hrs per week per person) through average allocation of work load (tasks) to each staffing resource. As work progresses, each task in the WBS can be manually monitored as to percent complete.

The goals of Project Management is simply, (1) breakdown of one project in to all individual smaller tasks associated with the project, assignment of individual tasks to different staffing resources, balancing of the work load or tasks (for example, avg. 40 hrs per week per staffing resources) across the staffing resources and tracking of the percentage completion of individual tasks and the entire project.

Business Intelligence (BI) is a term used to describe the collection of information from existing databases. For example, revenue information is usually at the transaction level (i.e. sales for a particular product from one store). The consolidation of this information over a company's disparate databases gives complete transactional view (i.e. total sales for all products across the United States). BI alone does not refer to the mapping of which information is to be collected. Consultants assist in determining what information needs to be collected, then use BI tools to create a collection system.

Data Mining is a term used to describe an analysis technique for pattern recognition. Data mining evaluates a selection of data in a spreadsheet or database for correlations. An analyst will look for certain types of information, when combined in an equation, serve as a "predictor" to the intended outcome. Data mining tools select one attribute or column of a data set as the "response" or goal. Next, any or all other attributes may be selected to as predictors to the response. The tool then evaluates the complete data set, including all samples in the data set (the rows), to determine which attributes combine to create a predictive equation for the response.

Prior Art System Model

FIG. 1 shows a schematic diagram of system 1, as typically modeled in systems engineering, having the typical elements of a system, namely: activities 3, resources 5, controls 7, input entity 9 and output entity 11. Because systems are typically modeled in terms of inputs and outputs from a system, the unidirectional arrows between the elements in system 1 indicate the direction of input and output from system 1.

The smaller squares within each element of system 1 indicates a sub-element, such as activities $3a$–$c$, resources $5a$–$c$, controls $7a$–$c$, input entity $9a$–$c$ and output entity $11a$–$c$. For simplicity only one level of sub-elements are shown in FIG. 1. However, in a typical system, each activity, for example, may be broken down into sub-activities $3a$–$c$, each one of which may be broken down into additional sub-activities, and further each one of the sub-activities may be broken down into more sub-activities to an infinite level of sub-activities.

FIG. 2 is a schematic drawing showing system 1 modeling an actual working example. The system 1 of FIG. 2 has the same elements as described in FIG. 1. Activities 3 is described in terms of a process having six sub-activities $3a$–$f$. Resources 5 contain four sub-resources $5a$–$d$ and controls 7 contain two sub-controls $7a$–$b$. From the system 1 in FIG. 2, two input entities $9a$–$b$ are input into activities 3 and are processed and subsequently output from activities 3 in three output entities $11a$–$c$.

Schematically shown in all of the sub-elements of FIG. 2 are three triangles with one inside of another. The triangles represent the prior art manner in which system 1 is measured and understood. Today, systems, including complex business systems are modeled in terms of inputs and outputs from a system. Within the system are certain known activities which are performed and which consume resources and are governed by controls. In order to measure and understand a system, each activity, resource, control and entity associated with the system is broken down into smaller and smaller sub-parts so that very detailed information about the small sub-elements which comprise the system can be obtained. The logic behind such a measurement method is simply the paradigm that if more detailed information is collected about the system it will be understood in terms of that level of detail. Computers have significantly aided in the collection and storage of very detailed information about systems.

The danger in measuring and understanding a system in terms of detailed information collected about the system is that such methodology overlooks important relationships about the system which occur at a higher or more general level. In other words, critical relationships, such as scheduling among the activities, which take place among the activities would be overlooked because the relationship occurs at the most general level rather than at the level of minute detail. In fact, by studying minute detail, one is simply studying relationships and patterns which may have no overall affect on the entire system. Simply because there is error and variation in modeling and studying systems, studying relationships between or among minute detail may become irrelevant if the standard deviation of the measurement of the sub-elements is larger than the level of detail of information which is collected.

FIG. 3 is a second example of system 1 having the typical elements of a system, namely: activities 3a, 3b and 3c; resources 5; controls 7; and input entity 9. As shown by the squares or triangles within each of the elements, there is a sub-element of that particular element, such as activities 3aa and 3ab. This shows that activities, namely activities 3a and 3b, can affect other activities such as activity 3a.

In fact, the system 1 of FIG. 3 is a model of a human system, namely energy consumption and how the system of energy consumption would be studied by conventional methods. As previously mentioned, systems are modeled in terms of inputs and outputs, resources, activities and controls which are relevant to the system. Systems are understood by breaking down the systems into as many minute sub-elements as possible and collecting information on all sub-elements. As previously explained, it is thought that by collecting detailed information the system as a whole will be understood on the detailed information level.

Referring to the system of energy consumption, energy consumption is itself an activity, indicated in FIG. 3 as activity 3a. If an individual were to study his or her own energy consumption it would most likely be for the purpose of gaining a better understanding of energy consumption to improve energy consumption in the body. In the example of FIG. 3 the goal of understanding energy consumption will be to improve energy consumption.

In the system 1 of FIG. 3 the sub-element squares indicate the level of the sub-element. For every element there is one level of sub-elements, such as for activity 3a there are two sub-elements 3aa and 3ab at the first level. Sub-elements at a more detailed level are shown by a square within a square. For the purposes of measuring and understanding energy consumption, it is practical to model the system at the first level of sub-elements. This is because in this example the goal is to improve energy consumption as it relates to personal appearance. If the goal were to study energy consumption at the cellular level, then energy consumption would likely be modeled with more sub-elements to obtain information about energy consumption at the cellular level.

In the example in FIG. 3, energy consumption 3a may be thought of in terms of energy consumption while awake 3aa and energy consumption during sleep 3ab. Input into the activity consumption 3a are resources 5 which can be fat 5a and genetics 5b. Input into activity 3a, specifically energy consumption while awake 3aa, is another activity namely, exercise 3b. Exercise 3b may be thought of in terms of types of exercises 3ba–bd. Another activity which is input into energy consumption 3a, specifically energy consumption 3aa, is normal movement or normal activity 3c.

Controls 7 which are actively studied in a typical human energy consumption system are a diet schedule 7a and an exercise schedule 7b. Input into system 1 is the input entity food 9 which can be thought of in terms of three meals 9a–c. Input entity food 9 will result in an output entity (not shown) that is not important in this particular system 1.

It is easy to understand the measurement methodology system 1 of FIG. 3 namely the energy consumption in the human body. For example, diet schedule 7a can be measured in terms of calories. Exercise schedule 7b can be measured in terms of time. The activity energy consumption 3a itself may be measured in terms of weight, namely as energy consumption increases more of the resource fat 5a is consumed, if input entity food 9 remains constant. The activity exercise can be measured in terms of time or distance in the performance of exercise 3ba–bd. The activity of normal movement 3c can be measured in terms of time walking or time each day spent awake. Input entity food 9 can be measured in terms of calories or food groups for each meal 9a–c.

Thus the system 1 of FIG. 3 illustrates the common elements associated with energy consumption 3a and the common methods of measuring the elements. Each of the elements is broken down into sub-elements of which more detailed information is collected, as represented by the triangles within each other. In this system 1, input entity 9, resources 5, activity 3b, activity 3c and activity 3a can be measured in terms of calories simply because each elements can be measured in terms of a caloric unit. A caloric unit of measurement is a very detailed level of information about a particular element such as activity exercise 3b. Activity exercise 3b can be measured or understood at a more general level than the caloric level, such as different types of activity exercises 3b, which may be more effective information for a person trying to understand his or her personal energy consumption.

Knowledge of the system in terms of calories may not be information which is relevant toward improving personal energy consumption. Certainly, calorie consumption versus time gives one historical information about energy consumption over a period of time. However, to specifically improve energy consumption, time and calories does not necessary provide information for directly affecting energy consumption by improving energy consumption in one's daily life.

In other words, by equating resources, activities, and entities in terms of calories, one may only learn differences among the elements. As shown in FIG. 4 measuring the elements involved in the energy consumption system gives one a view such as that diagramed in FIG. 4. FIG. 4 shows energy consumption activity 3a being related to input entity 9, resources 5, activity 3b, activity 3c and control 7. If the elements were measured in terms of calories, FIG. 4 would show the differences among the elements in terms of calories. To obtain information relevant to the controls, specifically diet schedule 7a, the information would need to correlated in some manner, for example in a manner as relevant to time. As shown in FIG. 4, if the elements were defined in terms of calories, mere differences among the elements do not indicate a proportional relationship among the elements, in terms of the direct effect of each element on activity 3a. While more energy may be consumed by exercise than by normal movement, normal movement is fundamental to the human system. Therefore, one would not necessarily decide to decrease the amount of normal movement because less energy is consumed in terms of calories.

The problem with measuring the typical system shown in FIGS. 3 and 4 is that lots of detailed information can be collected and correlated, however, such information does not necessarily assist in making a decision about improving energy consumption. Having information about elements in terms of total calories, one could certainly choose among elements which theoretically consume more energy, but if those elements are activities which are never performed then the goal of improving energy consumption is not realized. Therefore, knowing the differences in energy consumption among the elements in terms of calories first, is not the most accurate system model for energy consumption because such a system is affected things other than calories, like the scheduling of the activities 3a–c, and second, because it is not an accurate system model it does not give one useful information for making decisions that directly impact energy consumption.

The prior art model described above is like an activity-based costing model except instead of measuring the activities in terms of dollars they are measured in terms of calories.

OBJECTS OF THE INVENTION

It is an object of the present invention to provide a method for controlling a process to achieve desired goals of the process.

It is another object of the present invention to control the primary process of an organization in order to achieve the desired goals of the organization.

It is still yet another object of the present invention to determine the drivers of the primary process of an organization and to determine the relative effects of the drivers on the primary process of the organization so that the drivers can be controlled to achieve desired results.

It is a further object of the present invention to identify the primary process flow, the drivers of that process flow, the metrics of the drivers and how the drivers relate to the key performance indicators (KPI's) of an organization so that metric measurements taken around the drivers can be related to the KPI's of the organization.

It is still a further object of the present invention to identify the process flows of the levels of an organization, the drivers of those process flows, the metrics of the drivers and how the drivers relate to the key performance indicators of the levels of the organization so that metric measurements taken around the drivers can be related to the KPI's of the levels of the organization.

It is even still a further object of the present invention to map any process comprising activities into a process flow which represents a model for the starting and duration of activities relative to each other so that a scheduling driver may be derived for the process.

It is an additional object of the invention to determine the operations driver of a process and to measure the metrics around the operations driver and to relate the metrics information to the KPI's of the organization.

It is still an additional object of the invention to evaluate the correlation of the scheduling driver and the operations driver of a process to past performance to determine if different attributes of the scheduling driver or the operations drivers should be measured.

It is even still an additional object of the invention to reevaluate driver metrics which are being measured so that as a process changes over time the specific driver metrics measured can be updated and changed if necessary.

It remains an object of this invention to provide a single unitary system for closed-loop monitoring and feedback that can evaluate multiple continuous projects at any specified time and can make evaluations of an organization, its resources and the risks and opportunities of one or more of its projects based on records of past performance and information for future projections.

It further remains an object of this invention to maintain a database of collected data and analysis.

It even further remains object of this invention to provide a data collection method that collects data relevant to analyzing strategic, oversight and planning objectives for multiple projects.

It is object of this invention to provide a single unitary system for closed-loop monitoring and feedback that can continuously and automatically collect and track data for multiple different projects in multiple different geographical locations.

It is a still a further object of this invention to provide a single unitary system that allows feedback from people working at different levels of a single project to be consolidated into corporate and market knowledge in the form of tracking reports and trend analysis.

It is yet a further object of this invention to provide a single unitary system for closed-loop monitoring and feedback that is standardized to work across multiple industries, businesses and projects and to work with standard analysis tools.

It is still yet a further object of this invention to provide a system to compare and analyze historical report analysis to understand correlations between process drivers and associated business attributes.

It is even a further object of this invention to project future business system dynamics measuring and comparing specific business metrics based on accurate historical data.

It is an additional object of this invention to provide a single unitary system for closed-loop monitoring and feedback that can continuously and automatically collect and track data simultaneously from multiple companies individually and multiple companies working together towards a common goal to evaluate their performance as a group.

It is still an additional object to gain insight into the dynamics of the overall business system.

Other objects, features and advantages of the present invention will become apparent from the following detailed description taken in conjunction with the accompanying drawings.

BRIEF DESCRIPTION OF THE DRAWINGS

FIG. 9 shows different categorizations of information one level below the activity exercise;

FIG. 10 models the different categorizations of the activity exercise at one level of depth;

FIG. 16 is a schematic diagram of the five process flows of the present invention that an organization follows to achieve its external goals;

FIG. 17 is a schematic diagram of the five process flows of the present invention for each of four levels in an organization;

DETAILED DESCRIPTION OF THE INVENTION

Introduction

Figure 1:
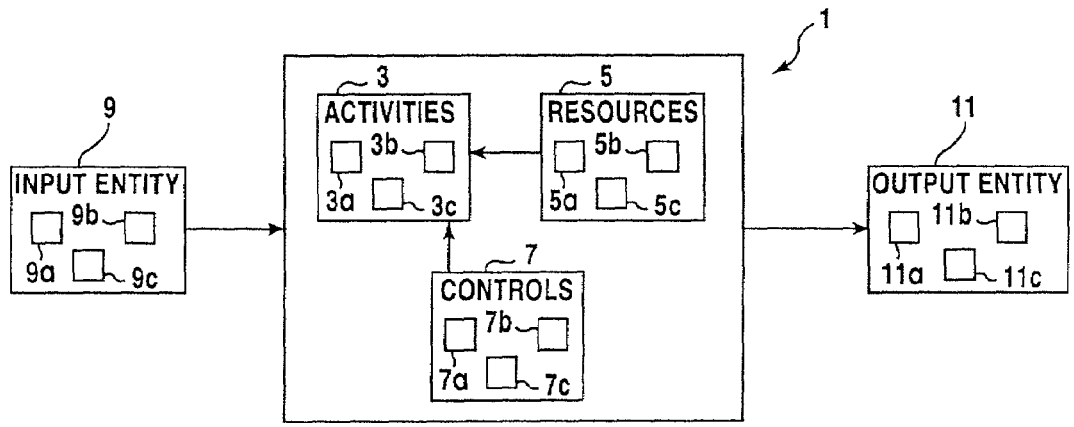
FIG. 1 is a model of a entity system, as commonly known in systems engineering.
Figure 2:
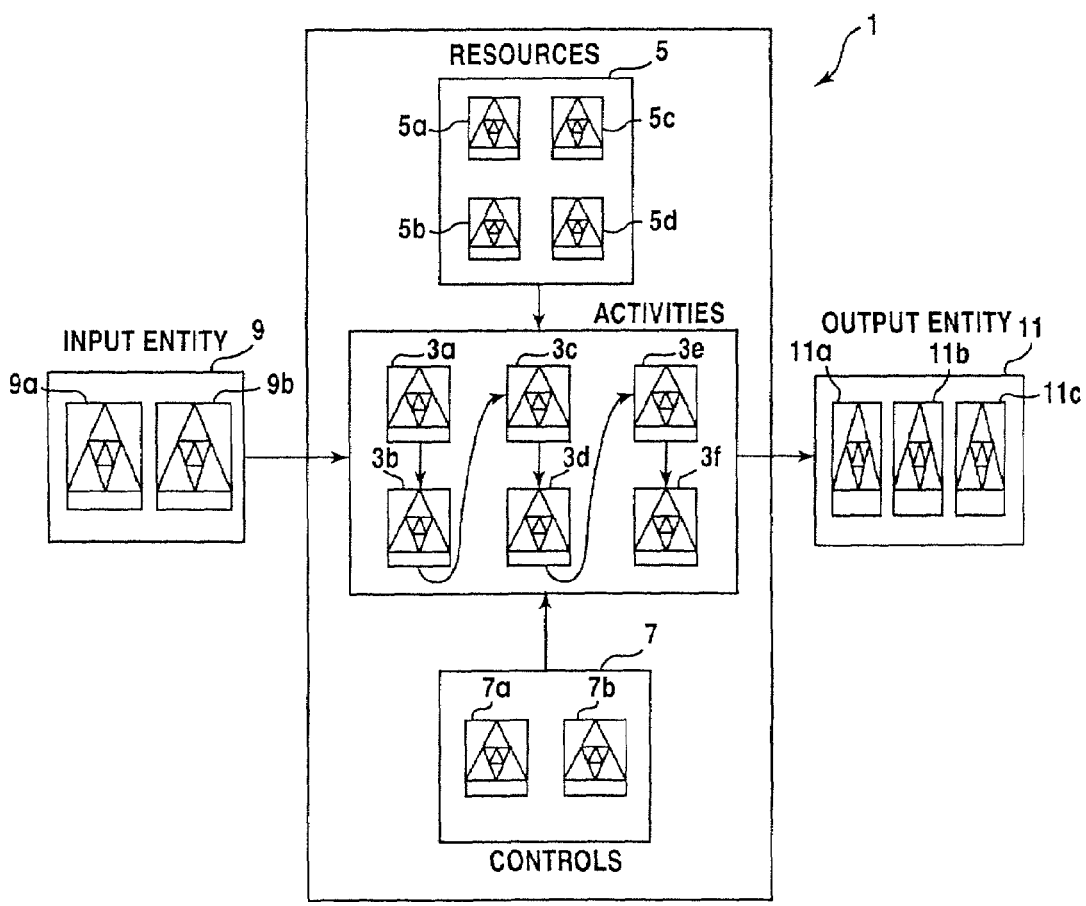
FIG. 2 is a prior art entity system modeling a working example.

Complex systems, especially business systems, are modeled in terms of inputs and outputs. In a typical systems model, as known in the field of systems engineering, an entity or entities are input into a system, work is performed on the entity and subsequently the entity which has been processed by the system is output from the system.

Broadly described, an entity is input into a system, the system performs work on the entity by reorganizing the entity or modifying it in some manner and the processed entity is output from the system. Work that is performed on an entity is typically done by an organized number of activities, with each activity performing one or more steps necessary to complete the work on the entity input into the system. Often each activity can be further broken down and described in terms, of sub-activities which can be further broken down into sub-activities which can further be broken down into more sub-activities to an infinite level of minute activities. Hereinafter, the term "activity" is defined as a single activity or a group or related activities however organized.

Activities do not start and finish at random. Activities are triggered by many things including the completion of other activities, the priority of a project, the input of resources, the operation of controls on activities, or the addition of another entity.

The term "process" describes an organization of activities. There are five different processes or process flows of the present invention relating to the process flows of a business or organization. The five different process flows organize activities based on five different schemes for the different durations of activities and for when the activities are scheduled to start and relative to each other.

The first type of organization or process flow is the Research Process Flow (RPF). RPF represents independent activities which start and end exclusively of each other and do not trigger the starting of other activities. An example of this process flow is a market research firm which conducts research on several unrelated projects.

The second type of process flow is the Research and Development Process Flow (R&DPF). R&DPF configures independent related groups of activities which start and end exclusively of other groups of activities, or loosely related to other groups of activities. Each group is comprised of activities related to each other by the finishing of one activity triggering the beginning of the next activity(s) within the group. An example of this process flow is a research and development laboratory of a drug company.

The third type of process flow is the Development Process Flow (DPF). DPF configures groups of activities which start and end in relation to one another. The exact beginning or ending of a group of activities is frequently not know. Rather, there is a loose causality relationship that triggers the beginning and/or ending of related groups. All groups of activities are related by the purpose to perform work on a common entity. Optional triggering of potential activities may depend on other objects in the system, such as resources. Therefore the process flow may have groups of activities triggered by constraints of resource availability. An example of this process flow is the development department of a product company like Procter and Gamble or development within the defense industry.

The fourth type of process flow is the Project Process Flow (PPF). PPF configures individual groups of activities not related to other groups of activities within the system. Each group is comprised of activities which are related to each other because the finishing of one activity triggers the beginning of one or more activities within the group. An example is a law firm or consulting office working on several different legal or business problems for several different clients.

The fifth type of process flow is the Operations and Maintenance Process Flow (O&MPF). O&MPF is an array of sequentially occurring activities with the completion of each activity triggering one or more activities. An example of this process flow is a manufacturing line for the manufacturing of an article in a factory.

Resources and controls are also standard elements in a system as commonly known in systems engineering. While activities are the tasks or actions that take place in the system, resources are the means by which activities are performed. Concrete examples of activities include filling a customer order, cutting a part, or repairing a machine. Typical examples of resources in the system include personnel, equipment, space, tooling, energy, time, information and capital. The controls of the system govern how, when and where activities are performed. Controls also determine what action is taken when certain events or conditions occur. At a broad level controls take the form of schedules, plans and policies. At a more detailed level controls take the form of written procedures and computer logic.

Below is a table of terms used to describe systems for performing work on entities.

TABLE I

| Term | Definition |
|---|---|
| Organization: | A structured group, individuals or companies, that work together and manage resources to achieve a common external goal. Organizations typically have a hierarchical structure of individuals or companies for accomplishing its goals. |
| Process: | An configuration of activities by which an organization achieves its external goals. A process is the summation of all the individual activities which must be performed to complete the process. There are five different processes or process flows of the present invention relating to the process flows of a business or organization. The five different process flows organize activities based on five different schemes for the different durations of activities and for when the activities are scheduled to start relative to each other. The five process flows are Research, Research and Development, Development, Project and Operations and Maintenance. |
| Activity: | A specified pursuit in which a person or thing partakes. An activity is any job or task that a person or team of people perform. An activity can also be defined as the work performed on an entity. "Activity" is defined as a single activity or a group of related activities however organized. |
| Project: | A group of related activities achieving a common goal or function. Activities can be grouped into a sub-project which is a sub set of a project. A project has a definite start time, duration, and consumes resources for completing the project. |
| Resource: | An input which is a valuable commodity used or partially used in accomplishing an activity, project or process. Examples of resources are capital, labor, time, information and land. |
| External Goals: | The purpose toward which a process, project or activity is directed; an objective. All organizations have external goals or purposes for existence. Although the goal of a pharmaceutical company is to produce drugs, the true goal of all business systems is profit. The external goal of governmental systems is to perform specified tasks optimally. |
| Metrics: | The application of statistics and mathematical analysis to a specified field of study. Metrics allow measurement of external goals. Metrics are most commonly defined as time, cost and quality. Determination of valuable metrics is a critical step towards understanding the progress of an organization. Tracking metrics leads to greater process understanding. |
| Key Performance Indicators (KPI): | The measurement of metrics. KPI's are tracked during a process or project to determine the effectivity of the process upon the metric(s). |
| Entity: | Something that exists as a particular and discrete unit. An entity is something an organization works around or with, it is the job for which the organization was created. An entity in a pharmaceutical development company is the drug under development. |
| Objects: | Resource, entity or activity. |
| Drivers: | One who, or that which, drives; the person or thing that urges or compels anything else to move onward. Drivers are what cause changes in performance or operational metrics of a process, project or activity. Most metrics (time, cost and quality) are controlled by a limited number of drivers. Drivers can include; entities, market information, customer satisfaction, staff machines, partner companies, contractors, work projects or manufactured goods and in-depth business information. |
| Scheduling: | A plan for performing work or achieving an objective, specifying the order and allotted time for each part. |
| Scheduling Driver: | A thing, object, or person that effects the scheduling of an activity. Scheduling drivers control when an activity begins, what activity will begin, or if an activity begins. |
| Operating: | To perform a function; to work. |
| Operating Drivers: | A thing, object, or person that effects the performance of an activity. Operating drivers control the metrics of time, cost or quality during an activity. |
| Attribute: | A parameter which defines a specific configuration or quality of a resource or driver. For example, an attribute of an oven may be temperature and an attribute of a mixer may be the speed at which it mixes. |
| Effecter: | A thing that causes something to be brought about by a cause or an agent; a result; the power to produce an outcome or achieve a result; to influence. Effecters are attributes associated with drivers that effect the changes within a driver's behavior. Drivers have many attributes with only a few having a great effect on the performance or behavior of the driver. |
| Selection Criteria: | Those attributes of a driver which are selected for measurement and monitoring. The specific selection criteria is believed or estimated to affect the metrics of the driver by 50% or more. |

TABLE I-continued

Data element: A portion of a memory structure configured in a specific arrangement by an act of writing or programming so that the structure thereafter conveys information by the converse act of reading. A data element describes, characterizes, or identifies an aspect of an object by virtue of the information conveyed by the data element.

Ticket: A ticket is an identification means for a computer or organize data. A ticket refers to the tracking of KPI's around a resource or entity during a process or project. A ticket collected is created for the purpose of organizing and analyzing data.

The method for studying a human system for energy consumption or a business system according to the present invention is has many similarities. The business system adds a level complexity to the study because the study of a business system involves the study of an organization which typically has a hierarchical structure of levels, with each level possibly using a different process flow to achieve its goals. The organization will have an overall process flow based on the most dominant process flow of all of the levels.

Decision Dynamics for a Simple System

Figure 5:
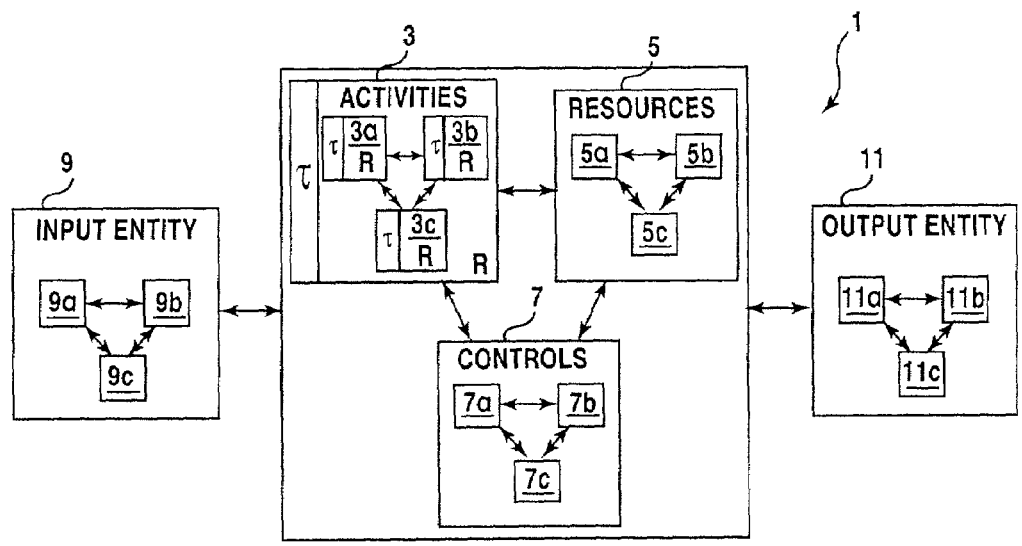
FIG. 5 shows the system of human energy consumption modeled according to the present invention.

FIG. 5 is a schematic overview of a system for energy consumption as modeled to illustrate the method of the present invention. The method of the present invention uses different relationships among the elements of system 1 and considers different information, such as scheduling information, about those relationships. System 1 as shown in FIG. 5 has the same elements as commonly known in systems engineering, namely: activities 3, resources 5, controls 7, input entity 9 and output entity 11. Each of the elements shown in FIG. 5 have sub-elements, such as activities 3a–c.

The method of the present invention for understanding and modeling a system is indicated at the broad or general level with bi-directional arrows among the elements and sub-elements of system 1. The bi-directional arrows represent a different relationship between the elements and sub-elements than the uni-directional arrows as shown in system 1 of FIG. 1. In the present invention the elements and sub-elements are related to each other because they can directly affect each other. Such a relationship can be measured in terms of the effect on the metric of the particular element.

Scheduling and Operations Drivers

One characteristic of the present invention is that it relates to or concerns a given element and any particular element or group of elements which affects, or is estimated or believed to affect, the metrics of the given element by 50% or more. In a system where a particular element is being measured and other elements affect the metrics of the measured element by 50% or more, then such other affecting elements are considered to be drivers. A driver is an element in a system which affects another element by a significant amount. Preferably the invention measures individual drivers or groups of drivers which, when taken as a whole, affect a particular element by 50% or more. In other words, of all the possible elements which could affect a given element in a system, the single element or the fewest number of elements which, when added together, affect 50% or more of the metrics of the given element are the drivers of that particular element.

Figure 6:
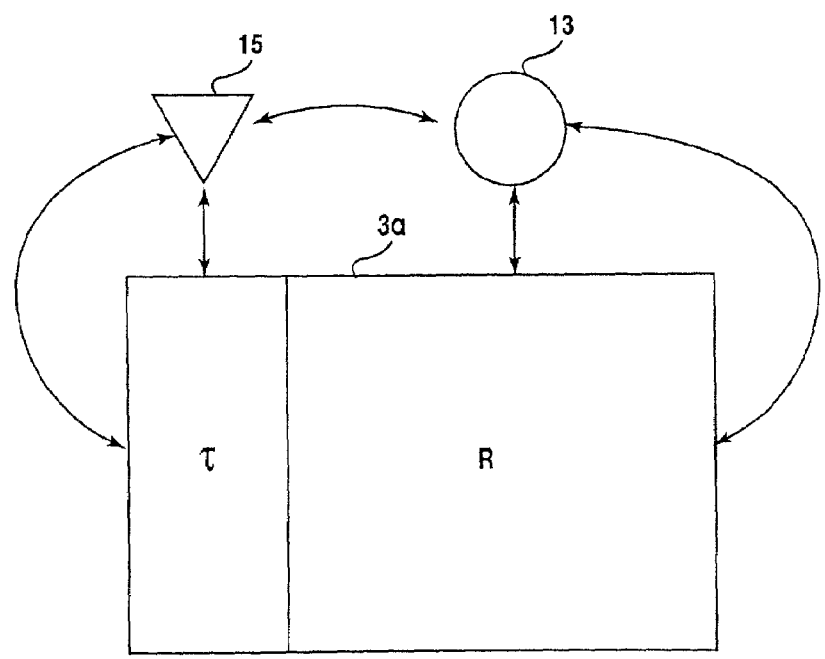
FIG. 6 is a model of an activity of the present invention.

FIG. 6 illustrates the driver and element relationship of the present invention as well as the scheduling relationship of activities of the present invention. FIG. 6 is an enlarged schematic view of sub-activity 3a shown in FIG. 5. Because an activity must take place or at least start at a definite point in time, the activity has a scheduling component. A scheduling component of an activity is the factor or factors that can affect when an activity is started, if it is started at all, how long the activity is performed, by whom is the activity performed, where the activity is performed, etc. These factors have a driver or drivers which have an impact on the time or scheduling of the start and duration of an activity. In FIG. 5 activity 3a has a scheduling component τ indicated by the division of the activity 3a into two parts with the initial portion representing a scheduling component. The driver of the scheduling component is a scheduling driver 15 indicated by a triangle.

Because every activity performs work or performs some function, every activity has an operational component. The operational component of an activity represents the work done by the activity. The operational component has a driver or drivers affecting 50% or more of the metrics of the operational component. Activity 3a has an operational component R, represented by the second portion of activity 3a, which has an operations driver 13 represented by a circle. The bi-directional arrows between the two drivers and activity 3a indicate a driver relationship. Furthermore, the bi-directional arrows between operational driver 13 and scheduling driver 15 indicate a driver relationship between the drivers.

Figure 7:
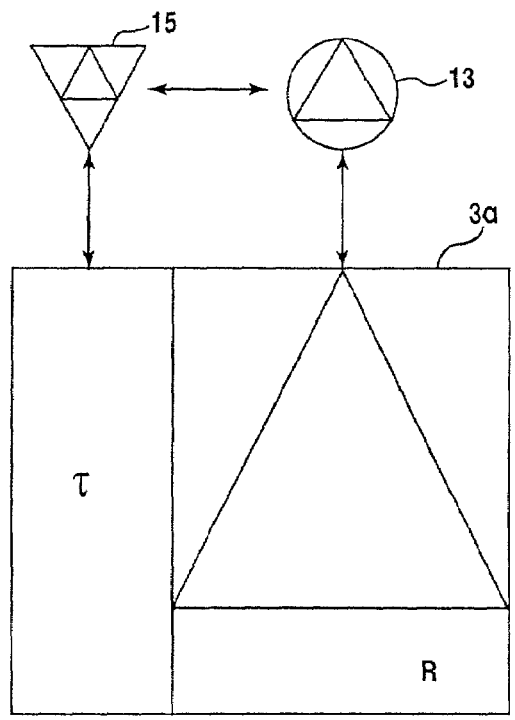
FIG. 7 is a more detailed model of an activity of the present invention.

FIG. 7 is a schematic drawing of activity 3a, as modeled according to the present invention, showing scheduling driver 15 and operations driver 13, all measured at one level of detail. The bi-directional arrows indicate the driver relationship between activity 3a and scheduling driver 15 and operations driver 13.

The present invention relates scheduling drivers and operations drivers to overall systems as well as scheduling drivers and operations drivers to elements within a system. FIG. 7 is a schematic of a system modeled around activity 3a. The overall systems as shown in FIG. 5 can be modeled to show overall system drivers, one or more overall scheduling drivers and one or more overall operations drivers.

All systems have drivers. A driver is the major component that affects the metrics of the system. Drivers can include: staff, machines, partner companies, contractors, work projects or manufactured goods and in-depth business information. The present invention can identify, measure and monitor the drivers of a system, particularly the scheduling and operations drivers, to create greater visibility into the elements of that system that have the greatest control over the system metrics. By measuring the drivers of the system and relating this to the KPI's of the overall system, the overall system can be controlled by making appropriate changes to the drivers to influence the KPI's of the system to achieve the desired goals of an organization.

It is important to monitor the scheduling driver(s) or operations driver(s) of a system or element of a system for different reasons. Scheduling drivers affect the beginning of an activity. The scheduling driver controls what activity is performed next, performed at all, performed in a certain location, and performed by a certain person. Scheduling drivers can cause extreme variation in the workload and distribution in a system. Outcomes to poor scheduling include: longer cycle time, increased costs, and poor quality. Scheduling issues can cause the greatest amount of variation in metrics, including extreme events, because they are often unpredictable and/or not known at the point at which they occur.

Scheduling drivers also relate to prioritizing activities that need to be performed. This can be critical so that the most important activities are performed first before the lesser important activities.

Organizations react to scheduling problems by hiring more people, outsourcing, or overloading internal business systems. These extreme actions cause an organization to make drastic adjustments during the overload and once again and after the overload during a slow time. Making better choices around scheduling balances resources and workloads, therefore balancing cost, time and quality of the entity.

Operating or operations drivers affect the activity itself Metrics around an activity are affected by a driver or drivers. For example, most for-profit organizations measure cost, time and quality as the metrics of an activity. Operating drivers are the drivers that control or contribute the most to the average of the system metrics. Most processing re-engineering work focuses on reducing metrics (time and cost) associated with an activity. Operations drivers cause the least amount of variability in most systems but add the greatest amount to the average cost and time metrics.

In a perfect world, for example, all entities would be scheduled evenly and only the operating drivers would affect an organization's metrics. However, most organizations have the greatest problems with balancing work demands and workloads. Therefore, an organization can be "re-engineered" and still have the same problem as before. The focus of the re-engineering is often not on the correct driver, the scheduling driver.

Driver Selection Criteria Effectors and Attributes and Measurement Level

Performance of a system depends on the activities of the drivers. Drivers of a system are affected by what the present invention identifies as selection criteria. These are attributes about the driver that are initially believed or estimated to create change in the driver, creating driver dynamics. The dynamic change in the drivers can cause system dynamic change. Therefore, it is important to understand how selection criteria are changing drivers and ultimately changing the system to be able to optimize the system. Some selection criteria need to be monitored or changed after correlation to the driver is discovered. Other effectors can be chosen to replace the original selection criteria. This knowledge and action creates an optimized system.

Returning again to FIG. 7, activity 3a is associated with scheduling driver 15 and operating driver 13. The triangles located within activity 3a, scheduling driver 15 and operating driver 13 represent the level of measurement of the system in FIG. 7. In the present invention, a driver oriented system, it is preferable to measure any element in the system at a depth of only one level of detail. The triangle, as previously indicated, indicates that the measurement of activity 3a. Measuring the scheduling driver 15 and operating driver 13 occurs preferably at the first level of detail below the general broad level of the activity itself.

In a driver oriented system it is preferable to measure the system at the first level of detail below the most general level. Typically, measuring more minute detail about the system is considered irrelevant and sometimes incorrect depending on the variation or standard deviation of the measurements taken. In other words, in a driver oriented system, minute detail about each element in the system is not necessary. Instead, drivers are selected based upon their cumulative affect on the system metrics (50% or more) and then the drivers and the activity or element itself are measured at the first level of detail of the particular element. By limiting the collection of information to preferably the first level of detail, unnecessary or irrelevant information is excluded from an analysis of the overall system. Measuring minute detail about the system is a drain on the time, cost and quality of the system so therefore it is preferable to limit the amount and level of detail about information collected to only that which is necessary.

The result of collecting information about the drivers and the elements themselves at only one level of detail is that an analysis of the system, which includes the relationships between the drivers themselves or the drivers and the activities or the activities themselves, gives a result in terms of the same level of detail of information that was measured from the system. If decisions are to be made about a particular system at a certain level of detail of that system, then it is important to obtain information and analysis about the same level of a system upon which a decision needs to be made. In this way, the present invention collects information at a specified level for each of the drivers and elements of the system, analyzes that information at the same level and gives results about the system at that same appropriate level.

Selecting the Operations Driver to Measure

Figure 3:
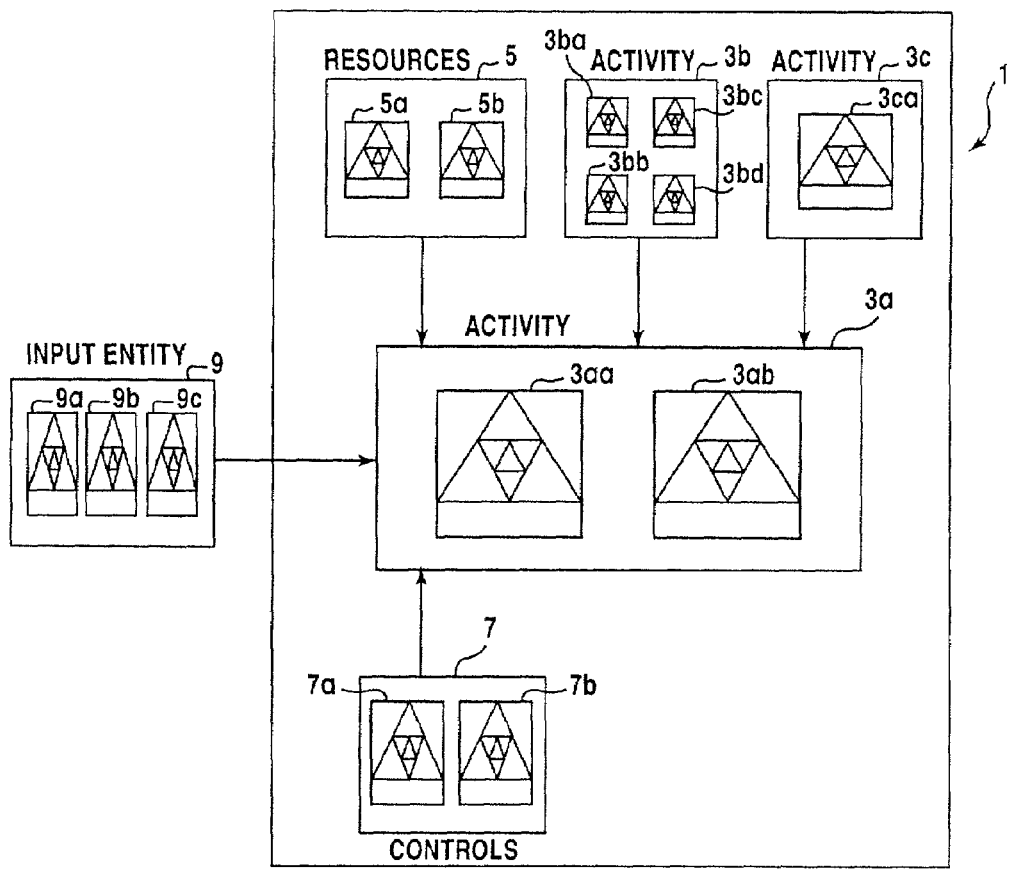
FIG. 3 is a prior art entity system modeling the system of human energy consumption.
Figure 4:
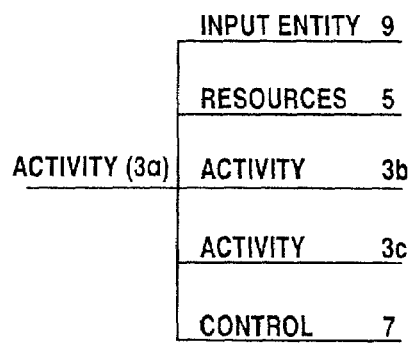
FIG. 4 shows the inputs to an activity of the system of FIG. 3.

FIG. 7 schematically illustrates energy consumption 3a according to the present invention. FIG. 3 shows the conventional system arrangement and measurement for a system for improving the quality of the activity energy consumption 3a. FIG. 7, on the other hand, models energy consumption 3a as FIG. 3 using the methodology of the present invention.

In the present invention a system is defined and measured in terms of drivers and their effects on each other and the elements of the system. For establishing a system of improving the quality of energy consumption 3a the drivers of the system must be chosen. To determine the drivers one must consider what elements of the system affect the metrics of energy consumption by 50% or more. In this case, a driver would be any element, or the fewest elements added together, which affects energy consumption by 50% or more. Energy consumption can be measured in calories and it can be determined, or at least estimated, which elements affect the quality of energy consumption by 50% or greater. To precisely determine or quantify the different elements in this system, elements could be compared in terms of calories input, output or consumed.

After considering the effect of all the elements as shown in the overall system of FIG. 5 on activity 3a (FIG. 7), it is determined that only one driver affects the quality of energy consumption by 50% or more. The driver is the activity exercise 3b. Therefore, the activity of energy consumption is an activity driven system because the operations driver is another activity, namely exercise. For this system, it is determined that the other elements such as controls like diet schedules, resources like fat, activities like normal movement and input entities like meals do not affect the quality of energy consumption by an amount significant enough to be considered alone or in combination with other elements as a driver of the quality of energy consumption. As a result, the activity exercise 3b is chosen as the operations driver 13 of activity energy consumption shown FIG. 7, according to the present invention.

Selecting the Scheduling Driver to Measure

Figure 8:
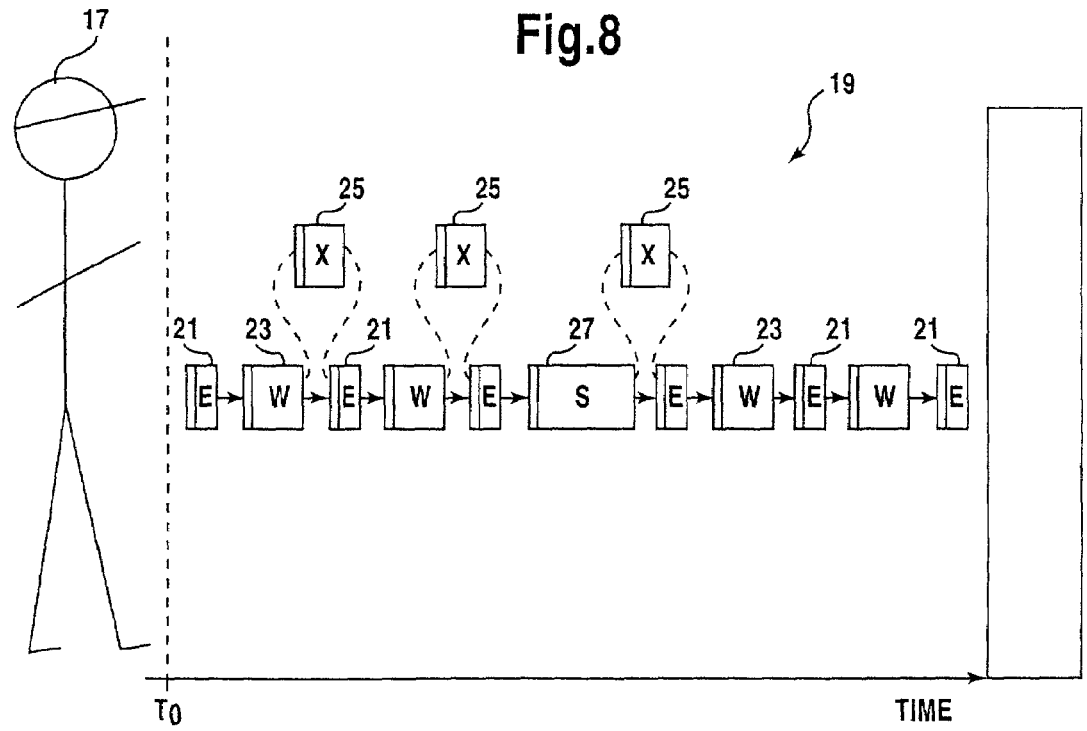
FIG. 8 is a shows the derivation of a scheduling driver.

The system of improved quality of energy consumption around activity energy consumption 3a also has a scheduling driver 15. The scheduling driver can be best understood in FIG. 8 which schematically shows how the scheduling driver is derived and how it is measured. Since scheduling drivers control what activities are performed next, performed at all, performed in a certain location, performed by a certain person etc., it is necessary to understand the particular activity or element to be measured in relation to the other elements or activities in the same system. FIG. 8 shows a non-military civilian 17 and a schematic representation of the process flow 19 of the daily activities of the civilian 17. The process flow 19 is simply a diagram of the organization of activities performed in the daily routine of civilian 17. The activities in process 19 have been simplified to four activities, namely, eating 21, working 23, exercising 25 and sleeping 27.

Each activity in process 19 is represented in the same manner as the activity shown in FIG. 7 having an operations component R and a scheduling component τ depicted by the internal line at the left hand side of the rectangle representing the particular activity. In process 19, eating 21 is also shown with the letter E, working 23 is also shown with the letter W, exercise 25 is also shown with the letter X and sleeping 27 is also shown with the letter S. The arrows in FIG. 8 depict the sequence of activities starting at time $T_0$ and continuing indefinitely. The dashed lines connected to the activity exercising indicate that the performance of the exercising 25 activity is optional in the daily routine of civilian 17.

In the process 19 of FIG. 8 civilian 17 regularly performs the activities of eating 21, working 23 and sleeping 27. Exercising 25 is an additional activity which must be scheduled within the process 19 of the civilian 17's routine. Exercising 25 may be scheduled after work 23 and before eating 21 lunch or dinner or it may be scheduled after sleeping 27 and before eating 21 breakfast. The process 19 shows the sequence of activities and the optional activities that comprises civilian 17's daily routine.

Therefore the scheduling driver for the system of improved energy consumption is the scheduling of the activity exercise 25 in the daily routine, the process flow 19 of an individual.

Determining Selection Criteria for the Scheduling Driver

In order to quantify the scheduling driver 15, the scheduling driver 15 must be measured. Drivers are measured by measuring specific selection criteria or other attributes of a driver. In the example of FIG. 8 possible attributes of the scheduling driver 15 (FIG. 7), namely the scheduling driver for scheduling the activity exercise which affects the metrics of the quality of energy consumption 3a (FIG. 7) by 50% or more, is for example length of time of the previous activity, the time of day when exercise 25 begins, the length of time of exercise 25 or the number of times exercise 25 is performed in a single day. In this particular system there are at least four attributes to the scheduling driver which can be measured. In the present invention it is preferred to measure the attributes which are believed or estimated to affect the metrics of the driver the most (by 50% or more).

As previously explained, determining which attributes of a driver to measure, the selection criteria, is an iterative process. In other words, specific selection criteria may be chosen for measurement and then measured. Over a period of time, while measuring the selection criteria, the result of the measurement will show whether the selection criteria affects the driver at all, a little bit, or significantly. It is preferred to measure selection criteria which affect the particular driver significantly. Attributes which do not affect a driver or which affect a driver very little are thus not effecters of the driver and it is not necessary to measure these attributes.

Referring again to the process 19 in FIG. 8 one can measure the length of time of the previous activity like working 23, the time of day the activity exercise 25 begins and the actual duration of exercise 25. After taking these measurements over a period of time it may be determined that it is the time of day at which the activity exercise 25 begins is actually the selection criteria which affects the performance of exercise 25 the most.

For example, if the measurement data showed that exercise 25 is always performed most efficiently (or even at all) if done early in the morning before breakfast, then it would appear that the most significant factor in determining whether exercise 25 was performed is whether exercise 25 could be scheduled for that particular time during the day. If other activities such as sleeping 27 conflict with the early morning time which is preferable for exercise 25, then exercise 25 will not be performed.

In another scenario, it may be determined that the length of time or duration of the previous activity is the attribute of the scheduling driver which affects the performance of the activity exercise 25 the most. This will be determined over a period of time by analyzing the data collected about the scheduling. If several attributes were chosen and measured which actually had no effect on the scheduling driver, then new attributes would need to be chosen for measurement.

Determining the Selection Criteria of the Operations Driver

The operating driver 13 of the system of FIG. 7 is the activity of exercise. As indicated in FIG. 7 by the triangle within operating driver 13, the activity exercise is measured at one level below the general activity of exercise. FIG. 9 defines exercise at one level below the general activity of exercise. FIG. 9 also indicates that exercise may be organized differently at the next level of detail. For example, one level below the general level of exercise may be exercises related to body systems 29. At this level of organization exercises are divided into groups which categorize exercises depending on their effects of particular body systems such as the cardiovascular system, the respiratory system and the muscular system. In other words, different exercises affect the muscles of the body while other exercises have more effect on the respiratory system or the cardiovascular system.

At a level of detail below the general level of exercise, one could organize exercises into types of exercises such as swimming, aerobics, running, weight lifting, etc. This is indicated in FIG. 9 by the level entitled types of exercise 31.

Another level below the general level, exercises may be organized into exercise relative to inputs 33. In this level, exercises are organized or grouped according to exercises which affect different inputs such as protein, carbohydrates and fat.

Because it is conceivable that at a level below the general level of any category elements may be organized or grouped differently, at least one organizational level must be chosen. Choosing how to organize different elements will depend on the desired goals of the system and the desired information to be obtained. In this particular system the goal is to improve the quality of energy consumption. Because it is known that energy consumption is also related to body systems such as cardiovascular, respiratory and muscular it would be logical to also group exercises as they relate to particular body systems. Because particular body systems have a different affect on energy consumption, knowing which exercises affect which body systems the most can give information about improving the quality of energy consumption.

FIG. 10 schematically shows the activity exercise 3b which is the operating driver 13 of the activity 3a of energy consumption. FIG. 10 shows that activity exercise 3b, depicted at the first level of detail, organizes exercises relative to the body systems, such as the cardiovascular, respiratory and muscular systems. The letter M is a designation of metrics, time, cost or quality of the particular activity. The quality of exercises is measured in the standard way as known in the art.

Figure 11:
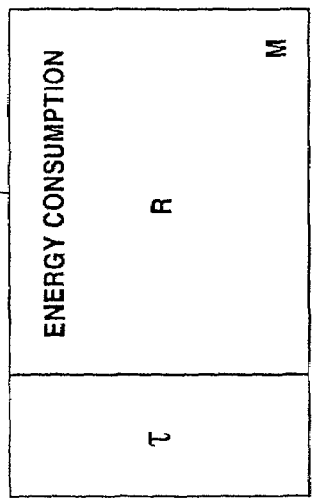
FIG. 11 models energy consumption according to the present invention.

FIG. 11 is simply a schematic drawing of activity 3a of energy consumption. The M designates metrics which can be measured by methods as known in the prior art. The internal line on the left hand side of the schematic energy consumption 3a of FIG. 11 or the schematic of activity exercise 3b of FIG. 10 indicates the scheduling component τ of the particular activity.

Summary of the System

In summary, the methodology of the present invention defines a system in terms of elements and the driver relationships as shown schematically in FIG. 5. The elements and sub-elements of the system of FIG. 5 are schematically represented individually by FIG. 6 which shows a scheduling component τ and an operations component R of each particular element, primarily activity. Scheduling driver 15 and operations driver 13 are related to each other and to the particular element being measured as shown in FIG. 6. FIG. 7 shows the level of detail of measurement of the elements and drivers in the method of the present invention. One triangle indicates one level of detail and therefore the measurement is limited preferably to one level of detail for any element and relevant drivers of the system. Attributes of drivers are measured in order to measure the driver.

FIG. 8 shows process 19 used for deriving and measuring scheduling driver 15 of the system shown in FIG. 7. The level of detail for measuring the activity of exercise is further described in FIGS. 9 and 10. FIG. 11 is a schematic of the activity energy consumption 3a around which the entire system has been modeled. The focus of the system of the present invention is on the scheduling and operations driver relationships among elements in a system and measuring elements and drivers themselves at preferably one level of detail to result in information at that same level. In contrast, the conventional system model as shown in FIGS. 1–4 is an input model of a system which focuses on the elements input into the system and measuring all of the elements at a minute level of detail in an attempt to understand the system at a similar level of detail.

The advantages of the present invention are that systems can be modeled and controlled more accurately by considering entire systems and each element within that system as having driver relationships with other elements of that same system including scheduling and operations driver relationships. By measuring scheduling and operations drivers and the metrics of the activity or activities of the system, the behavior of a system over time can be well understood and controlled.

Figure 12:
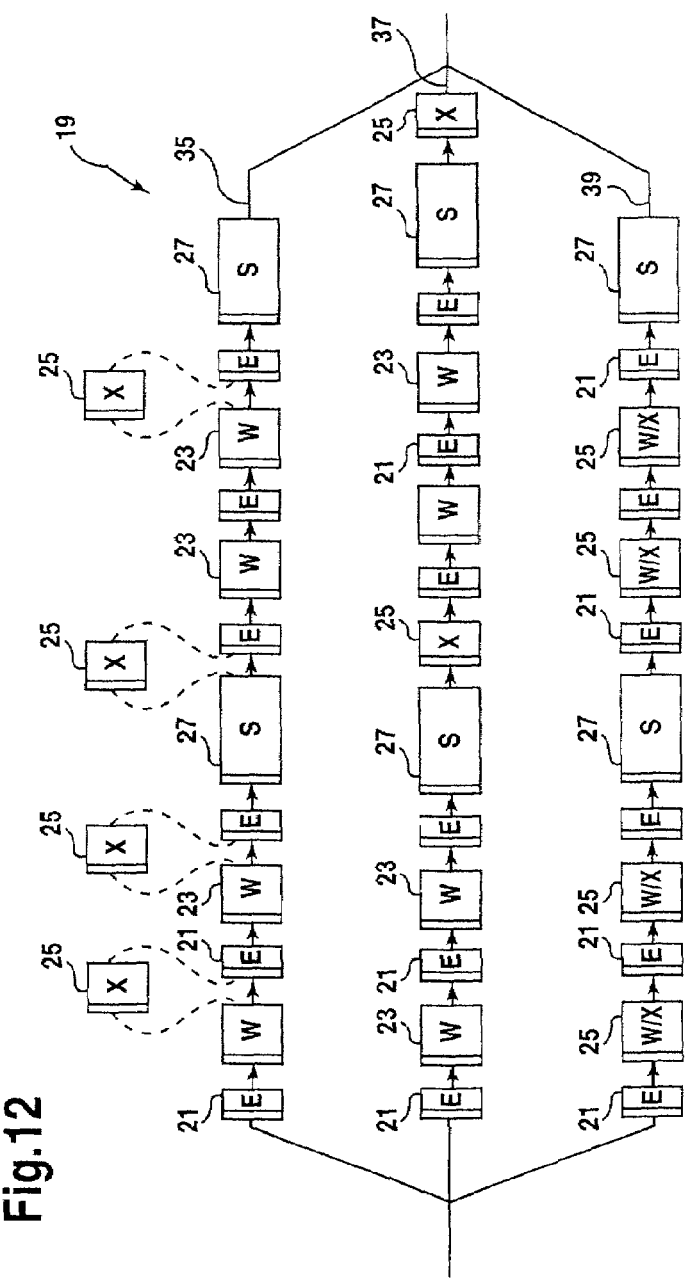
FIG. 12 shows 3 process flows for deriving the scheduling driver according to the present invention.

FIG. 12 indicates that there can be three different process flows 19 having the four basic activities eating 21, working 23, exercising 25 and sleeping 27. The three different process flows 19 depend upon the particular individual. The first process flow 35 is the same as that depicted in FIG. 8 the process for a civilian non-military individual 17. The second process flow 37 is the process flow 19 for a military individual in which the activity exercise 25 is a mandatory activity in the daily routine of a military individual. The third process flow 39 is the process flow of an athlete where the activity working 23 is the same as exercising 25. Because an athlete's work is exercise at a particular sport, the third process flow 39 looks different than the second process flow 37 and the first process flow 35. The scheduling driver for each process flow can measured in the manner as previously described.

Determining a Process Flow

For this simple system the process flow is discussed last. In business systems, process flows follow a pattern and are typically determined first. In this case, however, a process flow will have to be chosen depending on the individual before the drivers of the system are measured. Knowing the proper process flow for the system in important in correctly identifying the relationships among the elements in the system. If the wrong process flow is chosen, the information collected will not give one a clear understanding of the relationships and therefore will not give a clear picture of what is driving those relationships.

The method of the present invention is designed to provide relevant information, which when acted on, can have a direct effect on the goal of the system, namely improving the quality of energy consumption to improve the physical quality of the human body. Knowing only caloric differences in activities that affect energy consumption is an inaccurate model of the system for energy consumption because calorie differences do not account for the fact that factors that affect the scheduling of the exercise activity are a significant driver of the system.

Decision Dynamics of the System

The present invention provides information on drivers of a system which when acted on most significantly affect the metrics of the overall system. The present invention achieves this by:

1) mapping a system by a process flow which serves the purpose of organizing activities based on different schemes for the different durations of activities and for when the activities are scheduled to start relative to each other, so that a scheduling driver information can be meaningful within a scheduling model for the system;

2) based on the goals of the system, determining an operations driver;

3) determining the selection criteria for the operations driver;

4) based on the goals of the system, determining the scheduling driver;

5) determining the selection criteria for the scheduling driver;

6) measuring the selection criteria over a period of time;

7) revising the selection criteria with other effectors if necessary;

8) continuing to measure the selection criteria over a period of time; and 9) using information collected about the selection criteria of the drivers to make decisions that directly affect the dynamics of the drivers and the dynamics of the overall system which affects the ultimate goals of the system.

Feedback of the System

It is important to track both business metrics through KPI's, and, the drivers and selection criteria for the drivers. Decisions are made based on certain assumptions about the selection criteria in order to create a specific change against the business metrics. Feedback occurs when the business system has preformed with the initial decisions against the selection criteria, and, KPI's have been measured. Analysis of correlation between the decisions made against the selection criteria and the KPI's is required. It is now possible to determine if, in fact, the selection criteria created, or is associated with, the change within the KPI's. If there is no correlation between selection criteria and a change within the KPI's, new selection criteria should be chosen. New selection criteria can be chosen by determining the desired change against the business metrics, determining the KPI's that measure a change, determining the drivers that affect the KPI's, and determining the selection criteria for the drivers. New selection criteria maybe chosen through analysis of correlation, or, may have to be chosen by industry specialists until such time data has been collected around the selection criteria.

Decision Dynamics for a Business System

The present invention can be applied to business systems just the same as human systems. The present invention is particularly relevant to understanding, measuring and controlling business systems. A business system is a system for understanding how organizations achieve external goals.

The Needs and Structure of a Business Organization

An organization, as defined herein, means a hierarchical organization having several different levels beginning with level one—the CEO and Board of Directors of an organization. Level two of an organization is considered to be the planning level, division directors of an organization, level three is the operational level of department managers, and level four is the transactional level of each department. An organization may have more than four levels but for simplicity of explanation organizations will be defined in terms of four primary levels.

Figure 13:
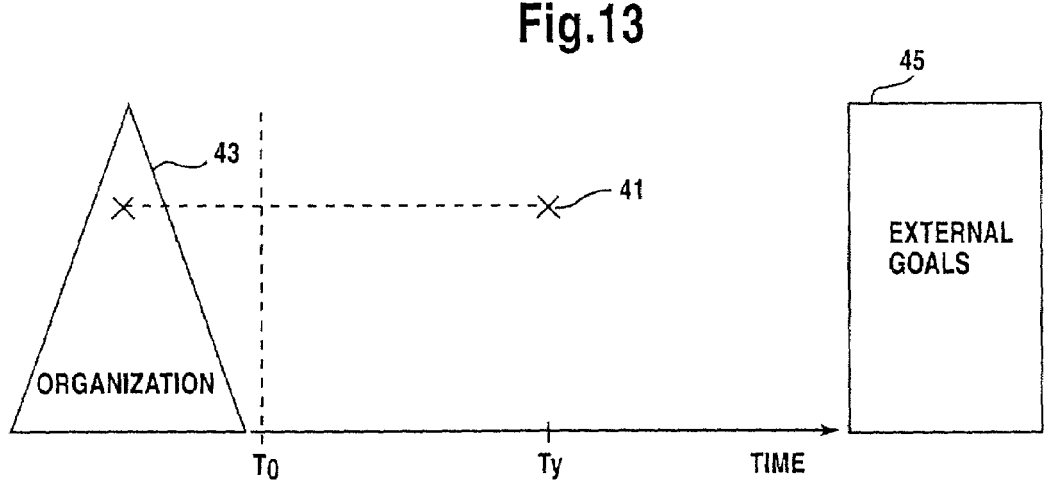
FIG. 13 represents a basic model of an organization achieving its external goals over time.

An organization as understood herein may be a single organization like a corporation or a company or may be a conglomerate of smaller organizations like smaller companies. FIG. 13 shows that at time $T_y$ a decision 41 needs to be made in an organization 43 which affects how organization 43 achieves its external goals 45.

Figure 14:
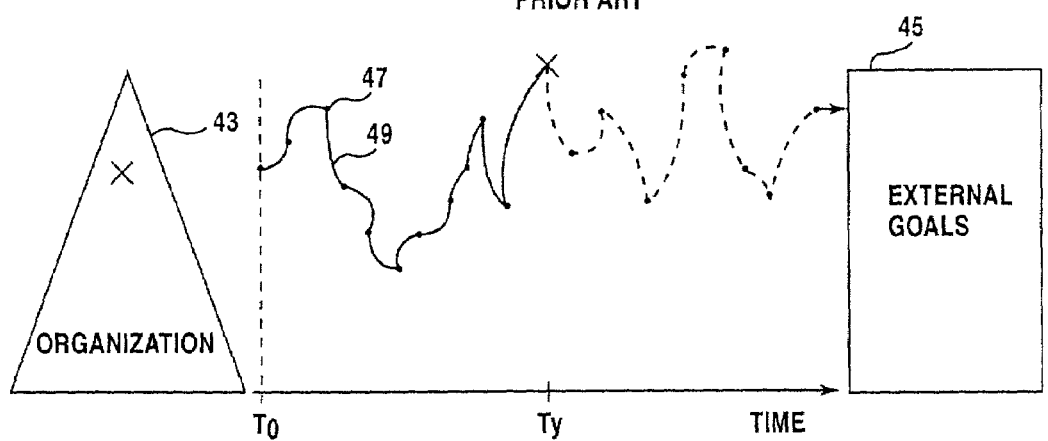
FIG. 14 represents a prior art scheme for mapping decision making by an organization over time.
Figure 15:
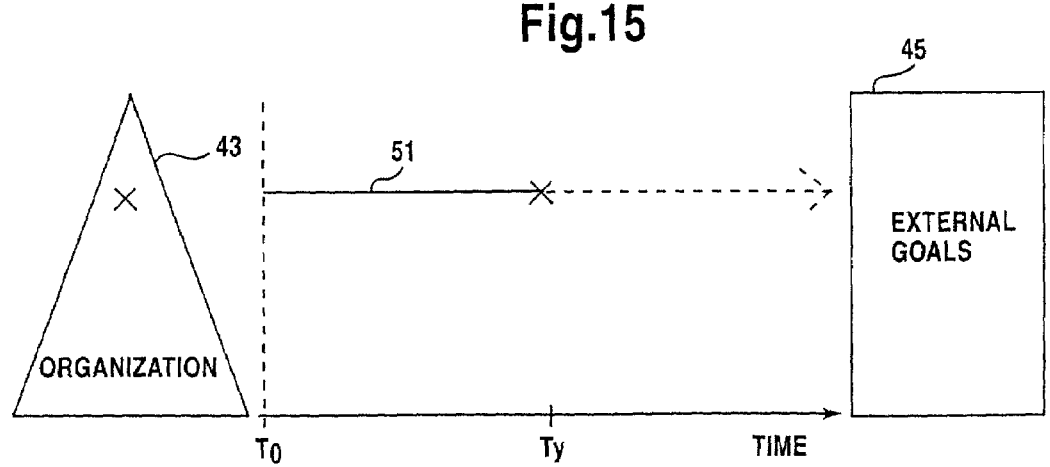
FIG. 15 represents a simple straight line model for decision making.

FIG. 14 indicates, as well known, that the path by which the typical organization 43 achieves its external goals 45 involves the deciding of many decisions indicated by points 47 along a path 49 to achieve the external goals 45. The circuitous path 49 extending from initial time $T_0$ to the time when the external goals 45 are achieved shows that decisions do not necessarily lead toward efficient forward progress toward external goals 45. Instead, progress may move sideways for a period of time before moving forward. For simplicity, the path by which organization 43 achieves external goals 45 will be indicated by a straight line 51 as shown in FIG. 15. Path 51 represents the process, which is the organization of all of the activities necessary to accomplish the external goals, by which the typical organization 43 achieves external goals 45.

Business systems may be organized into five different process flows for achieving external goals. The five process flows are five different ways of organizing activities with a scheduling component. In other words, there are five different ways to group activities based upon their relation to each other with respect to the order in which they are or are not scheduled to start. Based upon the kinds of activities an organization performs, the organization, or one of its four levels or divisions within a particular level, will proceed along one of the five process flow paths to achieve its external goals. FIG. 16 indicates that business systems can be defined in one of five different process flow paths which depict five different organizational arrangements of activities. Similar to FIG. 12 where the four same activities were arranged in three different process flows, business systems may be defined in terms of one of five different process flows.

The five process flow configurations of a typical business system is illustrated schematically in FIG. 16 by the five pronged process line 53 extending from organization 43 at initial time $T_0$ to the external goals 45.

FIG. 17 illustrates that each level of a hierarchical organization typically achieves its external goals or performs work in a different process flow than another level of the organization. FIG. 17 illustrates that each level of organization 43 can achieve its external goals 45 by a different process flow indicated by the five pronged process line 53 extending from each level.

Figure 18:
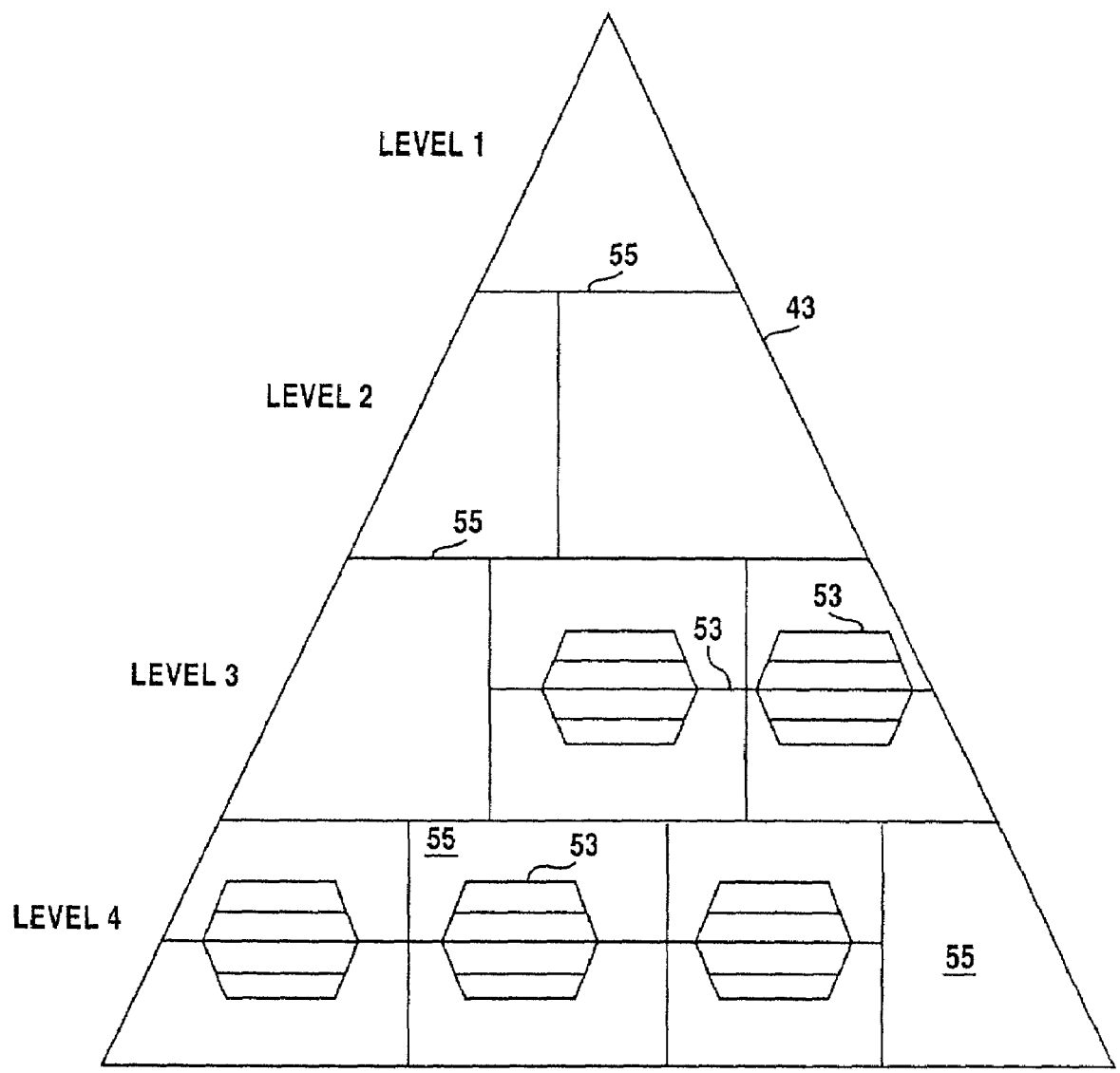
FIG. 18 is a schematic diagram of the five process flows of the present invention for individual departments at different levels of an organization.

In fact, within each level of an organization there are divisions of that organization. Each division within each level of an organization performs work to achieve its goals in one of five process flows, which may be different than the process flow of a different division within the same level of an organization. This scenario is illustrated in FIG. 18 which shows the divisions 55 of organization 43 which achieve their external goals by the five pronged process line 53 indicating that one of five different process flows may be taken to achieve the external goals.

Figure 19:
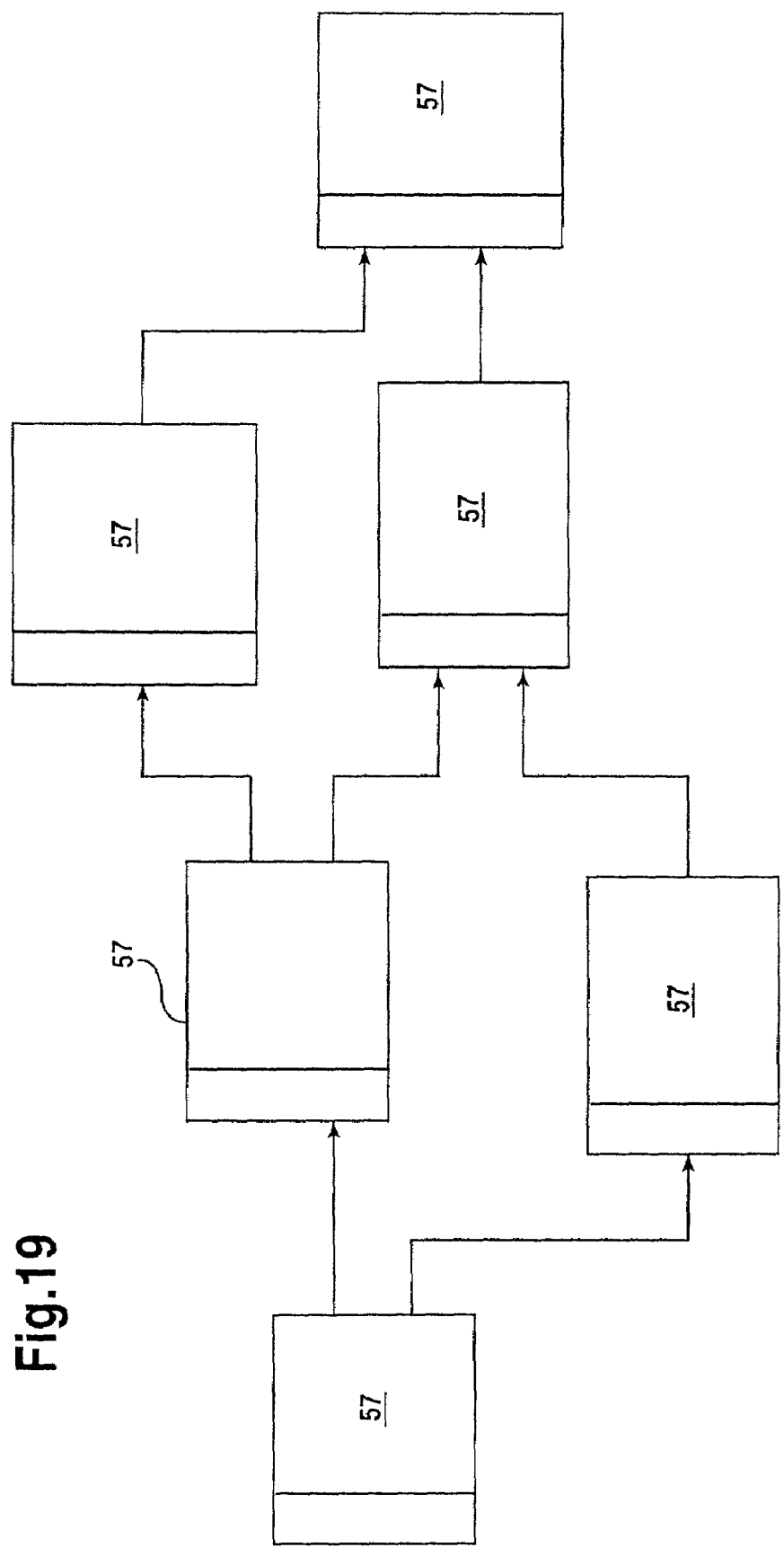
FIG. 19 is a diagram of a process flow.

FIG. 19 illustrates a process flow of activities in which the completion of an activity 57 triggers the beginning of another activity 57. The arrows show the direction of the process flow and the time sequence of activities 57. One differentiating factor in process flows of the present invention is the difference in how the activities are related to each other by time scheduling.

Five Process Flows of a Business Organization

Figure 20:
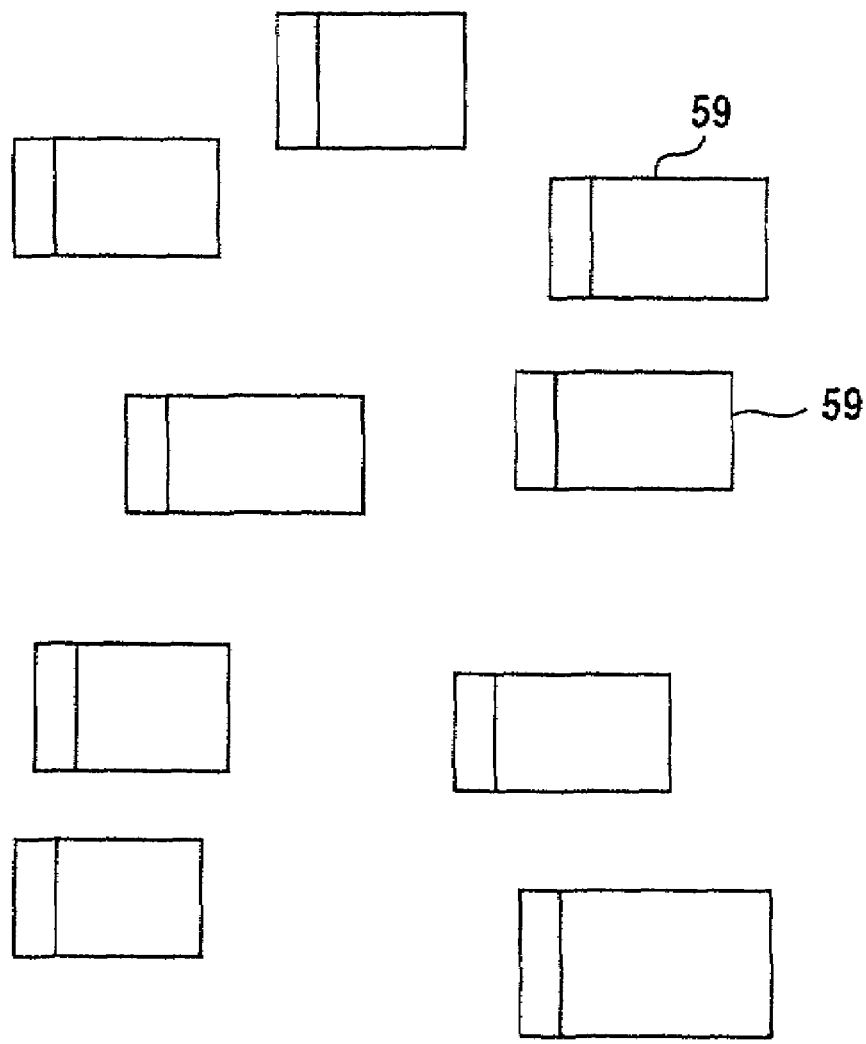
FIG. 20 illustrates the research process flow of the present invention.
Figure 21:
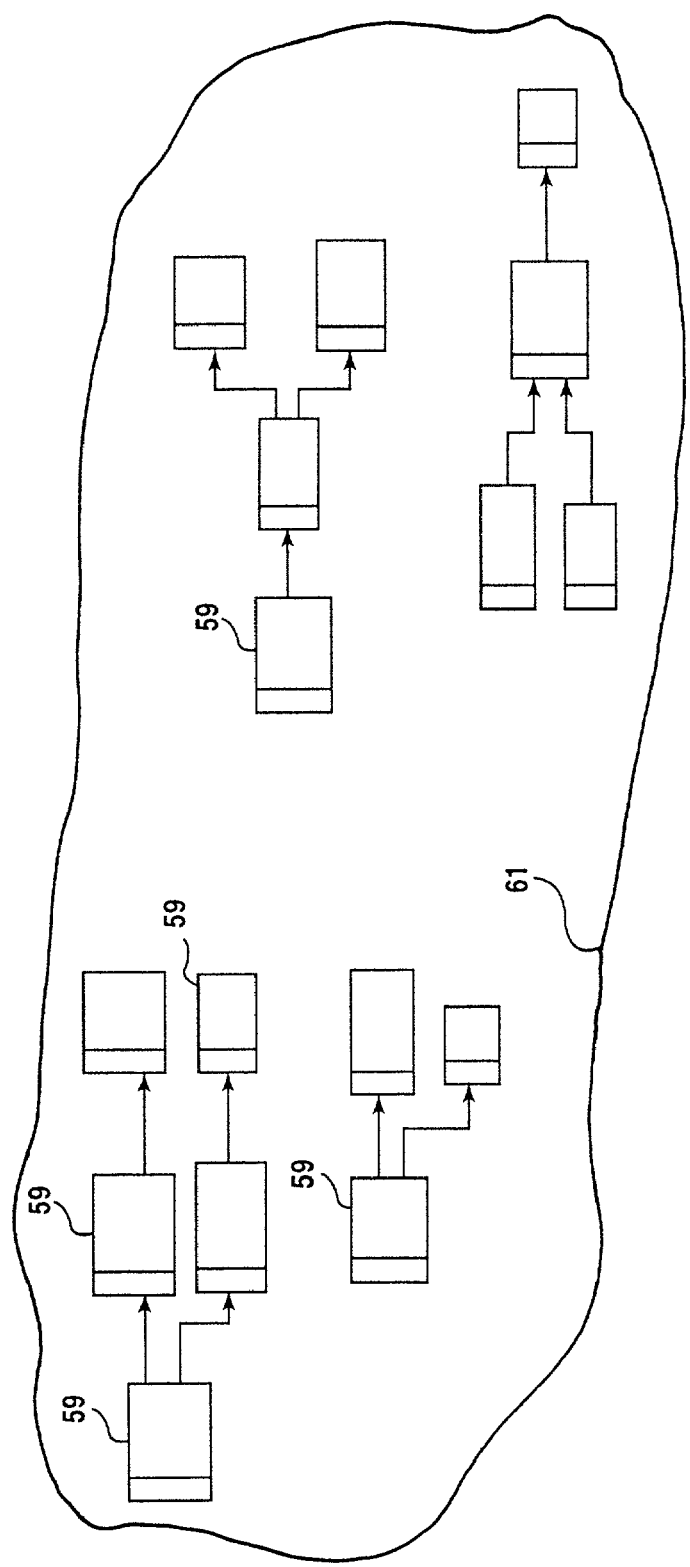
FIG. 21 illustrates the research and development process flow of the present invention.
Figure 22:
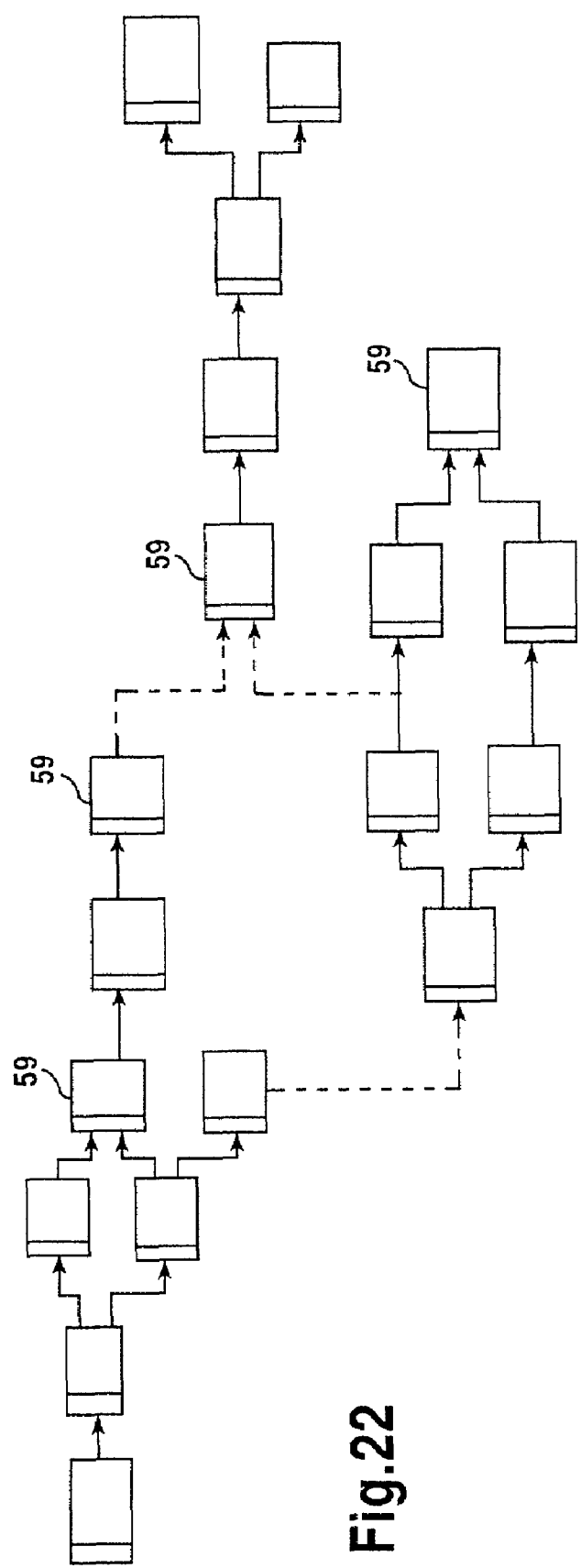
FIG. 22 illustrates the development process flow of the present invention.
Figure 23:
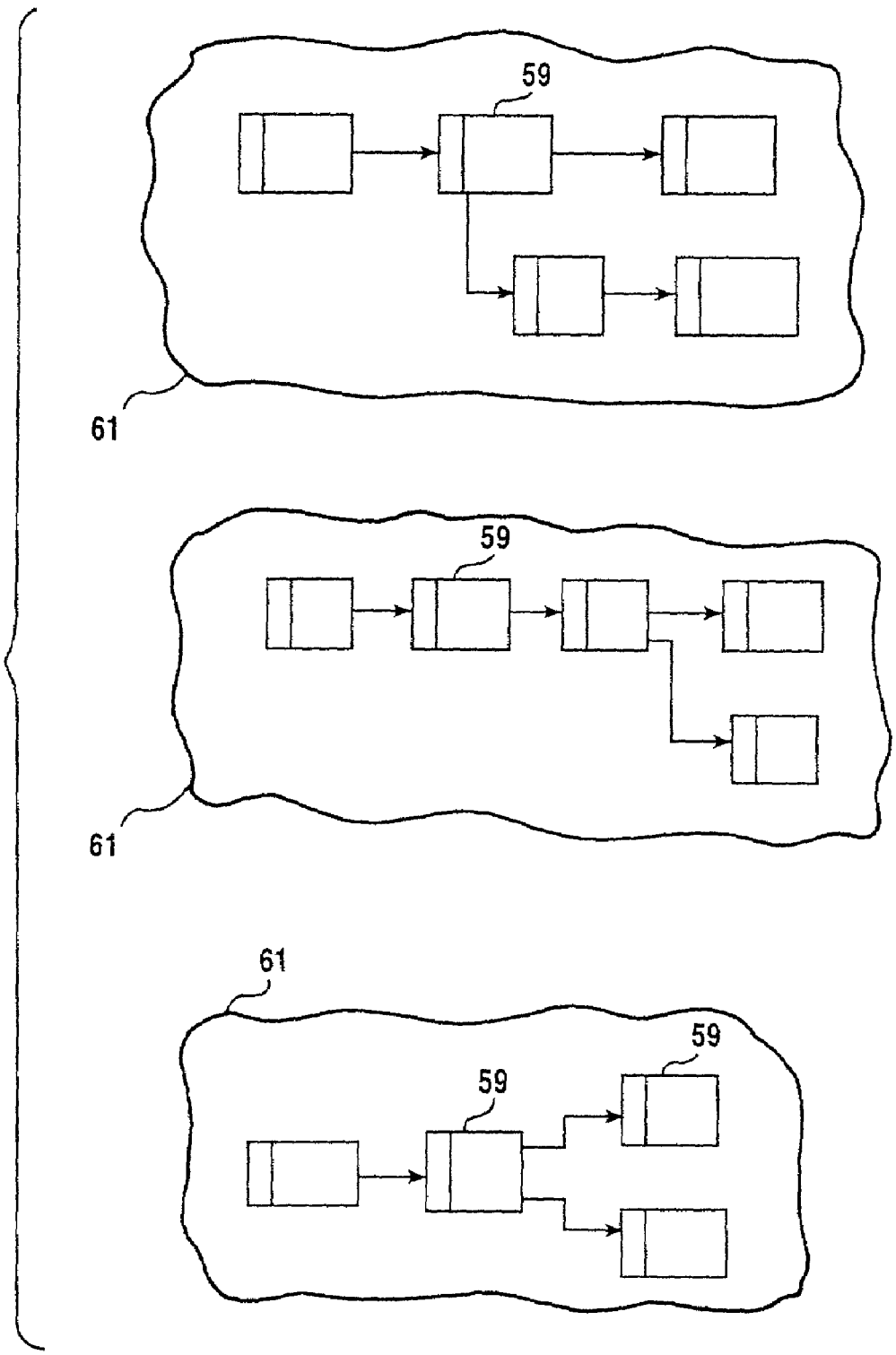
FIG. 23 illustrates the project process flow of the present invention.
Figure 24:
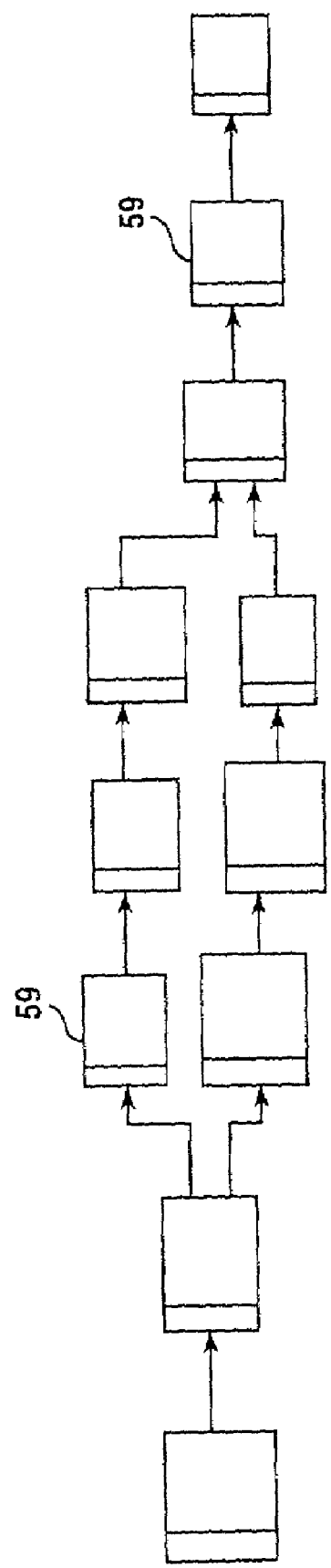
FIG. 24 illustrates the operations and maintenance process flow of the present invention.

The five different process flows of the present invention are illustrated in FIGS. 20–24. FIG. 20 shows a Research Process Flow, FIG. 21 shows a Research and Development Process Flow, FIG. 22 shows a Development Process Flow, FIG. 23 shows a Project Process Flow and FIG. 24 shows an Operations and Maintenance Process Flow. Each of FIGS. 20–24 show processes comprised of activities 59 as in the previously explained processes, the arrows indicate the direction of flow and triggering of particular activities 59. A line 61 drawn around activities 59 in the research and development process flow of FIG. 21 and in the project process flow of FIG. 23 indicate related groups of activities. In the case of the research and development process of FIG. 21 all activities are related toward the development of a particular entity. In the case of the project process flow in FIG. 23, the entire project process flow is made up of groups of unrelated projects indicated by the line 61.

Further distinguishing features among the business system process flows of FIGS. 20–24 are given in Table 2. Table 2 shows a comparison of the five different process flows in terms of typical number of groups of activities, the average cycle time of each process flow in terms of minutes and months and an example of each process flow.

TABLE 2

| | # of Groups | Lengths (avg) | Example |
|---|---|---|---|
| Research (R) | 30+ | Minutes to days | Drug discovery for pharmaceutical industry |
| R&D | 15–30 | Days to weeks | Drug development for pharmaceutical industry |
| Development (D) | 5–15 | Days to weeks | Defense building systems |
| Project (P) | 3–5 | Weeks to months | Consultants, lawyers |
| Operations & Maintenance (O&M) | 1 | Weeks to months | Manufacturing |

In order to understand the scheduling driver of a business system of a particular level or division of an organization, the particular process flow of that level or division within the level of the organization must be understood. The particular process flow is defined in terms of one of the five different process flows of FIGS. 20–24 as described herein. Process flows can be determined in part based on the distinguishing characteristics listed in Table 2.

Organization, Process Flows and External Goals

Figure 25:
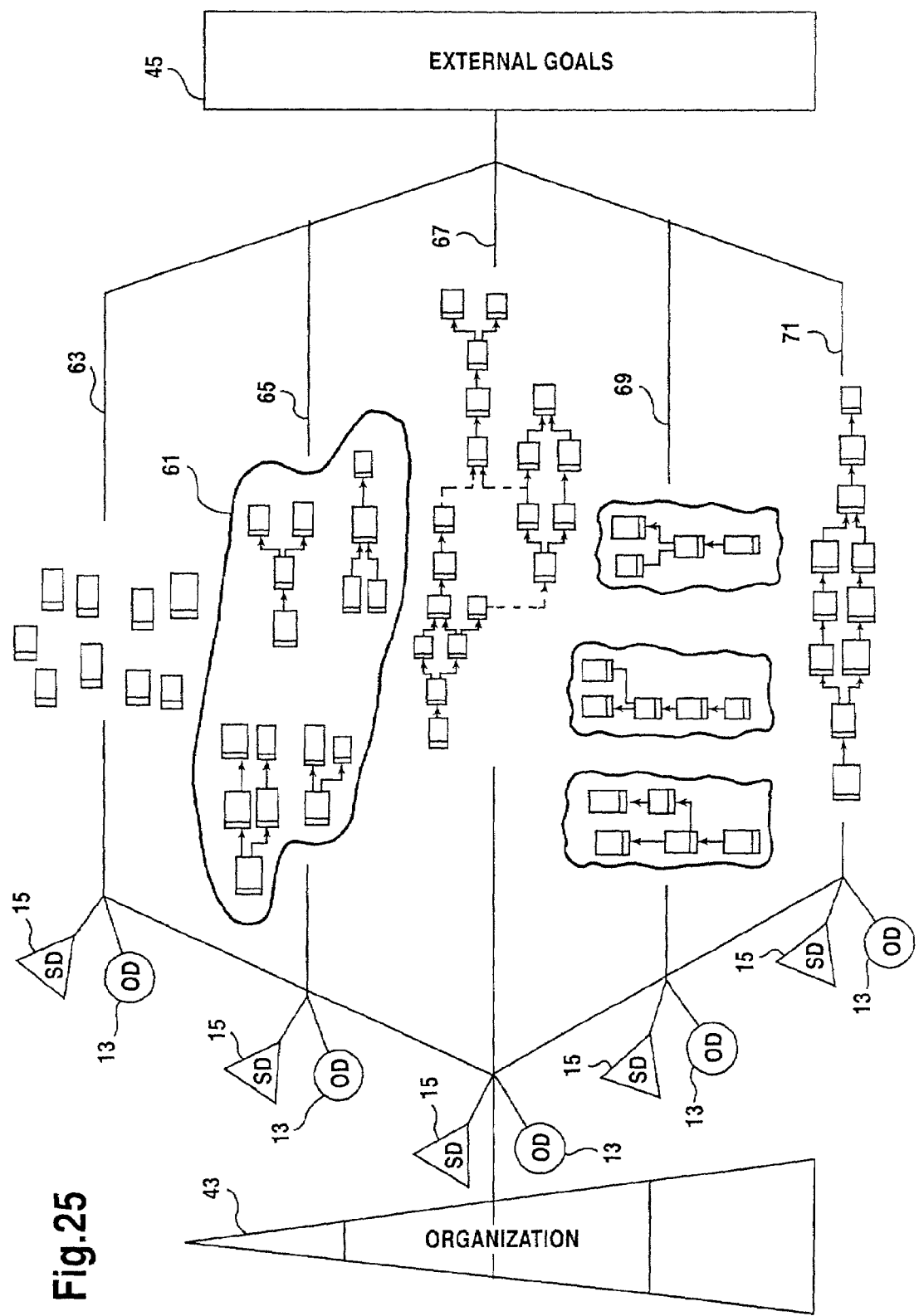
FIG. 25 illustrates the five process flows of the present invention as the means by which an organization achieves its external goals.

FIG. 25 shows a detailed view of the five business system process flows, namely: research 63, research and development 65, development 67, project 69 and operations and maintenance 71.

Scheduling is a factor in differentiating the activities of the business system process flows. In research 63 the ending of an activity does not correspond to the beginning of another activity. In research and development 65 the beginning of a sequence of an activity does not correspond to another set of activities. In development 67 there is a loose correlation from the end or completion of one activity in a process to the beginning of the next set of activities. In project 65 processes are well defined. Projects are not correlated with the beginning and ending times of other projects. Activities follow a well defined path with a beginning and an end. Each project works on one entity or one job at a time. The same team or person works on the entire project team as assigned to the entity. In operations and maintenance 71 the activities and order of activities are well defined. Many entities or jobs go through the same steps sequentially. People are assigned to activities or machines but not entities.

Figure 26:
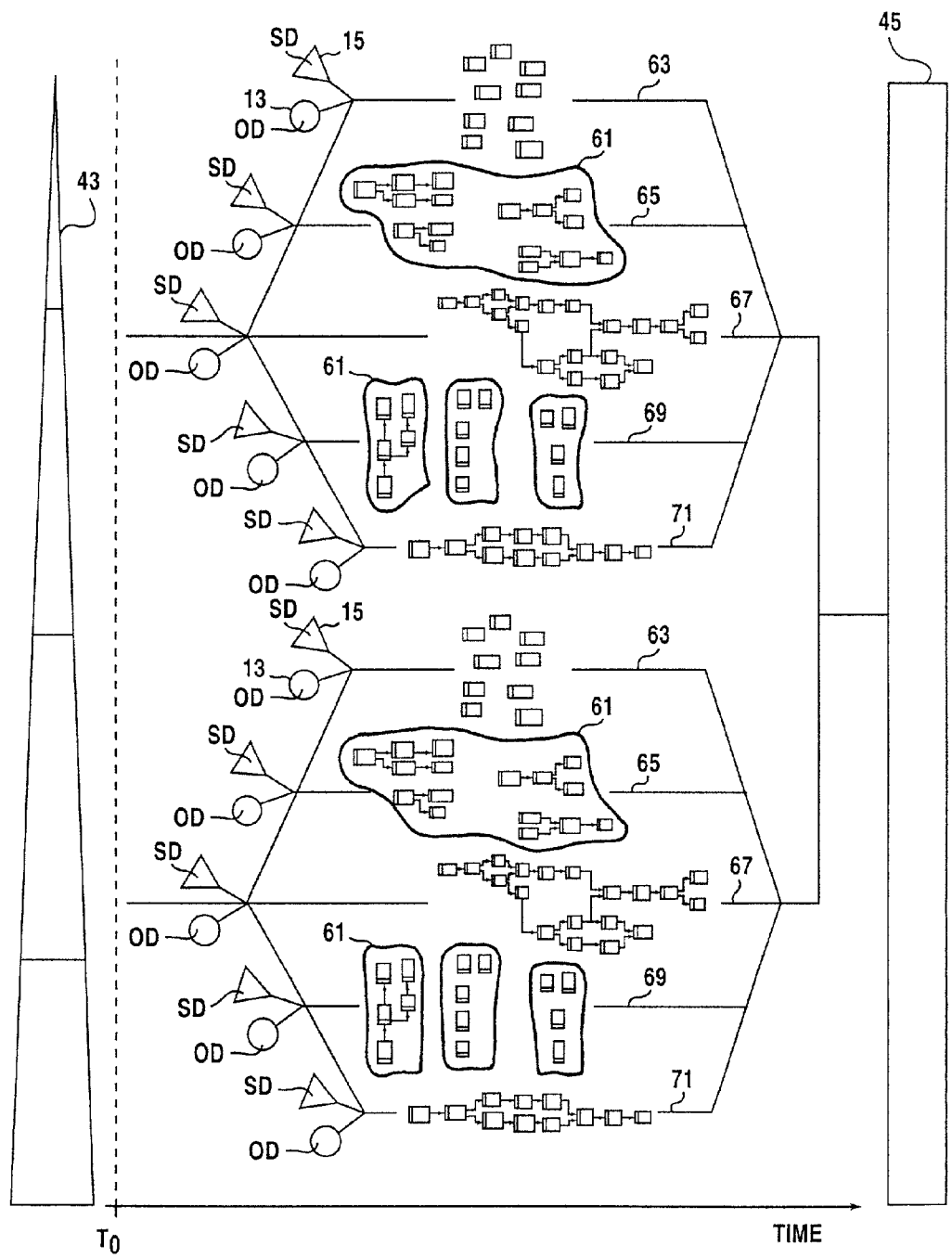
FIG. 26 illustrates the same process flows as FIG. 25, for two different levels in an organization.

FIG. 26 shows the five business system process flows that organization 43 uses to achieve external goals 45. Each of the five process flows has at least one scheduling driver 15 and at least one operating driver 13 (FIG. 6). FIG. 26 shows the process flows of level two and level three of organization 43 to achieve external goals 45. Level two and level three of an organization 43 may use a different process flow such as research 63 research and development 65, development 67, project 69 or operations and maintenance 71 to achieve external goals 45.

Scheduling and Operations Drivers

According to the present invention, for each of the five different process flows the scheduling driver 15 and the operating driver 13 are weighted differently in terms of their importance. The weighting of the scheduling driver 15 as compared to the operations driver 13 is important for more accurately modeling the particular process flow, in some the scheduling driver is more important than the operating driver and the reverse is true for other process flows. For example, in operations and maintenance the scheduling driver counts for 0–20% of the system while the operating driver is weighted at 80–100% of the total. Opposite that is the research process flow in which the scheduling driver is 80–100% important while the operations driver is 0–20%. Table 3 indicates the priority of the scheduling driver and the operations driver for the different business process flows of the present invention.

TABLE 3

| Process Flow | No. | Sch % | Ops % |
|---|---|---|---|
| Research | 1 | 80–100% (pref. 80) | 0–20% (pref. 20) |
| R&D | 2 | 65–80% | 20–35% |
| Development | 3 | 50% | 50% |
| Project | 4 | 20–35% | 65–80% |
| Operations & Maintenance | 5 | 0–20% (pref. 20) | 80–100% (pref. 80) |

Scheduling vs. Operational Drivers

Scheduling Drivers: Scheduling Drivers are always entity classifications. The entity, (item, project, part, or case), will contain various levels of information. Each level will encompass an increasing broad variety of information. The level descriptions are below.

Level I. Item/Order Level—Level I encompasses information about the current entity being considered. No historical nor future projection analysis about the entity is considered. Examples of this are: customer priority, due date for the entity, and priority of the entity against other entities.

Level II. Known outside attributes and historical accumulations—Level II encompasses historical profitability, time, and quality KPI's about the current entity type. Examples are: Previous selling history for the item type, current cumulative orders for the customer ordering the item, and total profit from previous sales cycles in regards to the entity.

Level III. Projected outside attributes and future projections. Level III encompasses historical accumulations, business analysis, and industry trends. Examples are: Who are the potential competitors, what is the projected market cap on an industry solution, and have we failed before and what can we do different.

Levels of Entity Classification: After determining the flow pattern—determine the scheduling driver. The chart below ranks the equivalent rankings of levels I to III against each other by flow pattern. Entity classification levels vary based on the chosen flow. A is the most important to C being the least important.

| | Research | R&D | Dev. | Project | Ops and Maint. |
|---|---|---|---|---|---|
| Level I | | C | C | A | A |
| Level II | B | A | A | B | B |
| Level III | A | B | B | C | |

Selection Criteria Attributes for Entity Priorities: When selecting the entity driver, the analyst must determine what variables are important in the selection process. The following list contains many of the probable variables:

Historical profitability by: item, item classification,
  Customer purchases by: item, time of year,
  Performance: to service level agreements (SLA) with customers, market share for an item,
  Potential return based of off market research.

Decision Outputs for Entity Drivers: All decisions for scheduling of entities will contain two outputs.

go/no go decision for the entity relative priority based on:

a. profitability, b. customer/SLA's

Operational Drivers

Operational Drivers are always Resource Priorities. Unlike entity classifications, resource management depends on the company not on the flow pattern. Any flow may have constrained or non-constrained resources. Therefore, either or both of these classifications may be used.

Selection Criteria Attributes for Resource Priorities: When selecting the resource driver, the analyst must determine what variables are important in the selection process. The following list contains many of the probable variables:

a. Non-Constrained Resources required cost and time parameters—selecting the lowest cost and shortest time parameter while meeting all of these steps, previous performance to cost, time, and quality standards, education, training, experience level to meet or exceed requirements for job, availability at the time required, b. Constrained Resources All attributes listed for non-constrained resources.

Availability at the time required

Resource Decisions: The decision will be determined by the lowest cost resource, availability, the needed time, with acceptable attributes.

Table 4 below gives examples of process flows by which organizations in several different industries achieve their external goals. Additionally shown in Table 4 are typical scheduling drivers and operation drivers.

TABLE 4

| Industries | Flow | Scheduling Driver | Operations Driver |
|---|---|---|---|
| Manufacturing | O&M | Level I and II orders based on customer priority | constrained resources in house |
| Financial project analysis | R&D | Levels II and III Information based on - historical return, potential return, a balance between projected opportunities and project risks | constrained and non-constrained resources - staff |
| Insurance-claims department | P | Level I, II, and III Which claim has been waiting the longest?, Which claim has the highest percent chance of being resolved? | constrained and non-constrained resources - staff and equipment |
| Consulting | P | Level I, II, and III Relative profit margin on the current projects, historical profit margins and risks | Resources - staff availability, optimal staff selection (lowest cost at an appropriate trained level |
| Health Care - Emergency room | D | Level II, I What type of problem does the patient have? Is it traditionally critical? Does this patient fit the description for criticality? | Constrained Resources - equipment, space, staff availability, |

TABLE 4-continued

| Industries | Flow | Scheduling Driver | Operations Driver |
|---|---|---|---|
| Pharmaceuticals - Drug development | R&D | Level II, III Information based on - potential return, a balance between projected opportunities and projected risks | Constrained and non-constrained Resources - staff availability, optimal staff selection (lowest cost at an appropriate trained level) |
| Marketing Research Efforts | R | Level III, II Information based on - market trends, locations, potential products, competition | Resources - staffing for peak demands |

Table 5 indicates how to determine the overall process flow of an organization in a particular industry when different divisions of the organization operate along different process flows. The system is basically weighting by percent the contribution or amount of money spent on each division of the organization within that industry. The division with the largest contribution is determinative of the general process flow of the entire organization.

TABLE 5

| | INDUSTRIES | | |
|---|---|---|---|
| DEPARTMETNS | GOV'T. FLOW #/% CONTRIBUTION | MANUFACTURING FLOW #/% CONTRIBUTION | PHARMACEUTICAL FLOW #/% CONTRIBUTION |
| Development | N/A | N/A | 2 58% |
| Research | N/A | 3 15% | 1 15% |
| Manufacturing | N/A | 5 65% | 5 15% |
| Marketing | N/A | 1 10% | 1 10% |
| Projects | 4 35% | 4 10% | 4 2% |
| Operations | 5 65% | N/A | N/A |

In summary, the present invention as applied to business systems as shown in FIGS. 13–26 is applied and measured as the invention is described for the human system of FIGS. 1–12. The application of the method of the present invention is the same. In brief, for the business systems in FIGS. 15–26, the system flow must be determined, followed by the drivers of that system flow. The drivers are the elements which affect the metrics of the system by 50% or more. Next, attributes of the drivers must be determined for measurement. Once the attributes have been determined they are measured over a period of time to gather information at one level below the general level. The collected data is then analyzed. The following section in this application, System Architecture, explains the particular methodology for collecting data for the method of the present invention.

Determining Scheduling and Operations Drivers—3 Industry Examples

Levels in a System:

1) Executive

2) Planning

3) Operational

4) Transactional

Industry Example 1

System: Software Company (creating a new product);
Process Flow: Research and Development;
Levels in the System: 2) and 3);
Problem: Difficult to determine how long it will take to complete the process, issues with developing the wrong product or for the wrong industry.

Selected Drivers:

1. Scheduling 60% Entity Level II then Level III
Is the product (type) up for consideration ranked the highest out of all other product (types) up for development out of the following criteria.

Level II
 what products have been successful, in which industries,
 what has been the profit margin over a period of time,
 how many sales were made over the period of time,
 how many problems occurred and were they avoidable for the next development effort Level III
 what do industry analysts say will be the next evolution in software for an industry,
 what is the projected market cap,
 who are the potential competitors,
 what are the "hidden risks" in development and can you identity and mitigate the risks 2. Operational 40% Constrained Resources (in house and outsourced)
 Are resources available when they are needed?
 How did these resources perform the last time they did this type of development? Was the development effort completed on time, within budget, and up to quality standard? (when applicable)
 Does the team have the level of education and experience necessary?
 Are they the cheapest option available that meets the above criteria?

Metrics Upon which Selected Drivers Have the Most Impact
1. (primary) Scheduling: for the software product under development—projected revenue, cost, and profits, potential risks.
2. (secondary) Operational: by prioritizing the projects under development ability to meet cost, time, and quality expectations for the lowest cost.

Outputs from the System
By tracking this information over time, it is possible to develop a mapping of which tasks tend to follow other tasks with a certain probability. This is very helpful to determine the total development cycle time when it is not clearly understood in the beginning.

How to Collect Data
From previous development efforts, and/or, tracking of current and future efforts, market research, collection of education information from resources.

Time for Collecting Data
Varies depending on the volume of historical data recorded, time available from resources.

Forecasted Risks and Opportunities
The following attributes will have varying relative weighted priorities.
 1. Risks:
  Poor education and experience levels from resources,
  Many risks reported from previous software efforts of the same type.
 2. Opportunities:
  High market caps,
  Few competitors,
  New industry segments,
  New technology.

Industry Example 2

System: Software Company (installation of software)
Process Flow: Project
Levels in the System: 4) and 3)
Problem: Missing schedule or cost estimations for the project, assigning to less important projects and missing the higher priority deadlines.

Selected Drivers:

1. Scheduling 40% Entity Level I then Level II
Is the product (type) up for consideration ranked the highest out of all other product (types) up for development out of the following criteria:

Level I:
Which customers need which projects? How important are those customers?
Which projects have the highest potential profit based on historical information?
Which projects have the lowest historical risks?

Level II:
What products have been successful, in which industries,
What has been the profit margin over a period of time,
How many problems occurred (time, cost, or quality failures) and were they avoidable for the next implementation effort.

2. Operational 60% Constrained Resources (in house and outsourced)
Are resources available when they are needed?
How did these resources perform the last time they did this type of implementation? Was the implementation effort completed on time, within budget, and up to quality standard? (when applicable)
Does the team have the level of education and experience necessary?
Is the manager of the team experienced?
Are they the cheapest option available that meets the above criteria?

Metrics Upon which Selected Drivers Have the Most Impact
 1. (secondary) Scheduling: by prioritizing the projects under implementation: projected revenue, cost, and profits, potential risks
 2. (primary) Operational: For the development process—ability to meet overall cost, time, and quality expectations How to Collect Data
From previous implementation efforts, and/or, tracking of current and future efforts, collection of education information from resources.

Time for Collecting Data
 Varies depending on the volume of historical data recorded, time available from resources.

Forecasted Risks and Opportunities
 The following attributes will have varying relative weighted priorities.
  1. Risks
   Poor education and experience levels from resources,
   Many risks reported from previous implementation efforts of the same type.
  2. Opportunities:
   Best practices from previous implementation,
   Experienced managers,
   Many previous successful implementations previously with this product,

Industry Example 3

System: Cancer Research, Pharmaceutical Research,
Process Flow: Research
Levels in the System: 4) and 3)
Problem: Many research hours with few new solutions or returns, no way to know how long it will take before a solution is discovered.

Selected Drivers:

1. Scheduling 80% Entity Level III then Level II
 Is the solution type up for consideration ranked the highest out of all other solution types up for development out of the following criteria.

Level III:
What problems/diseases are currently the greatest problem?
What problems/diseases is the company focused on?
what do industry analysts say will be the next evolution in drug/disease development
what is the projected market cap,
who are the potential competitors,
what are the "hidden risks" in development and can you identity and mitigate the risks Level II:
what products have been successful, in which industries and countries,
what has been the profit margin over a period of time,
how many problems occurred in previous development efforts with the type of drug under development and were they avoidable for the next development effort 2. Operational 20% Constrained Resources (in house and outsourced)
Does the team have the level of education and experience necessary?
Are resources available when they are needed?

Metrics Upon which Selected Drivers Have the Most Impact
 1. (primary) Scheduling: by determining the highest priority drug/solution type (i.e. penicillin) to develop: projected revenue, cost, and profits, potential risks.
 2. (secondary) Operational: Rate of success for creative processes are driven by experience and historical performance for the resources.

Data to Collect about Drivers
listed above

How to Collect Data:
 Market research, tracking of current and future efforts, collection of education information from resources.

Time for Collecting Data:
 Market research is usually already collected for these industries. Resource education and experience for all available resources is available. This effort will vary depending on the size of the company, number of researchers and contractors, and the number of types of drugs/solutions developed.

Forecasted Risks and Opportunities:
 The following attributes will have varying relative weighted priorities.
  1. Risks:
   Developing a solution to a lower priority problem,
   Develop a solution with small incremental improvements over the previous solution,
   Develop a solution in an area with a lot of competition or a market leader,
   Many risks reported from previous development efforts of the same type of solution,
   Low returns on historical performance for the researcher,
   Lack of creative solutions in previous research efforts,
   Poor education and experience levels from resources.
  2. Opportunities:
   Large problem areas (i.e. cancer) without a definitive solution,
   New diseases/problems,
   Experienced researchers,
   Many previous successful development efforts previously with this type of drug/solution.

Sample Risk and Opportunity Chart after 1 Year or 6 Months:
 Will vary depending on the forecasted risks and opportunities for all potential types of drugs/solutions under development.

Decision Dynamics System Business and Feedback Examples

Decision Dynamics
 Decision Dynamics refers to the way decisions are made. The business system managing objects such as resources, entities, and activities, needs to make decisions based on prior knowledge of the behavior of the objects. Previous performance, risks and opportunities, and other business metrics need to be understood prior to making each decision. By monitoring the current business system it is possible to gain insight 3 major areas.
The pattern or ordering of the activities of a system
The priority of entities, or projects, against one another
The selection of resources based on historical performance

WORKING EXAMPLES

Example 1

The Pattern of Ordering of the Activities of a System

Model description for the example:
Process description within the company: Full Drug Development
Flow for the Process: Research and Development
Projects within the Process: Trials required in Full Development Case Study:
 A pharmaceutical company wants to develop a new chemical entity (NCE) for a heart disease drug. The company knows they will begin the trials at the end of January. For the next year, the company needs to know:

1. What trials will need to be preformed?
2. When are the trials expected to begin?
3. What order will the trials tend to occur?
4. How long will they tend to take?

Because none of the trials are triggered by the previous trial and some trials require varying amounts of time management does not intuitively know the answers to questions. A sample of 10 NCEs past performance is collected and mapped.

Estimations Required for Development of Heart Disease Drug New Chemical Entity (NCE)

| sample instance | Adjusted Start Date | Actual Start Date | End Date | Duration |
|---|---|---|---|---|
| Trial A | | | | |
| 1 | 1 | 1 | 2.5 | 1.5 |
| 2 | 1 | 1 | 3 | 2 |
| 3 | 1 | 1 | 3 | 2 |
| 4 | 1 | 2 | 3.8 | 1.8 |
| 5 | 1 | 2 | 4.1 | 2.1 |
| 6 | 1 | 2 | 4.3 | 2.3 |
| 7 | 1 | 2 | 4 | 2 |
| 8 | 1 | 3 | 4.9 | 1.9 |
| 9 | 1 | 3 | 5 | 2 |
| 10 | 1 | 3 | 5.1 | 2.1 |
| | | | 1.97 avg | |
| Trial B | | | | |
| 2.5 | 2.5 | 5.6 | 3.1 | |
| 2 | 2 | 5 | 3 | |
| 5 | 5 | 8.1 | 3.1 | |
| 3.8 | 4.8 | 8.8 | 4 | |
| 1.1 | 2.1 | 5.1 | 3 | |
| 1.3 | 2.3 | 5.3 | 3 | |
| 4 | 5 | 8.2 | 3.2 | |
| 4.9 | 6.9 | 9.9 | 3 | |
| 3 | 5 | 8 | 3 | |
| 0.1 | 2.1 | 5.3 | 3.2 | |
| 2.77 avg | | | 3.16 avg | |
| Trial C | | | | |
| 6.6 | 6.6 | 7.9 | 1.3 | |
| 2 | 2 | 4.2 | 2.2 | |
| 8.1 | 8.1 | 9.1 | 1 | |
| 5.8 | 6.8 | 7.8 | 1 | |
| 1.1 | 2.1 | 3.3 | 1.2 | |
| 8.3 | 9.3 | 10.7 | 1.4 | |
| 9.2 | 10.2 | 11.2 | 1 | |
| 4.9 | 6.9 | 7.9 | 1 | |
| 8 | 10 | 11 | 1 | |
| 4.3 | 6.3 | 7.9 | 1.6 | |
| 5.83 avg | | | 1.27 avg | |
| Trial D | | | | |
| 7.9 | 7.9 | 9.9 | 2 | |
| 6.2 | 6.2 | 8.5 | 2.3 | |
| 9.1 | 9.1 | 10.1 | 1 | |
| 8.8 | 9.8 | 11 | 1.2 | |
| 2.3 | 3.3 | 6.3 | 3 | |
| 7.7 | 8.7 | 10.7 | 2 | |
| 9.2 | 10.2 | 11.2 | 1 | |
| 2.9 | 4.9 | 8.2 | 3.3 | |
| 8 | 10 | 12 | 2 | |
| 5.9 | 7.9 | 9.5 | 1.6 | |
| 6.8 avg | | | 1.94 avg | |

Figure 27:
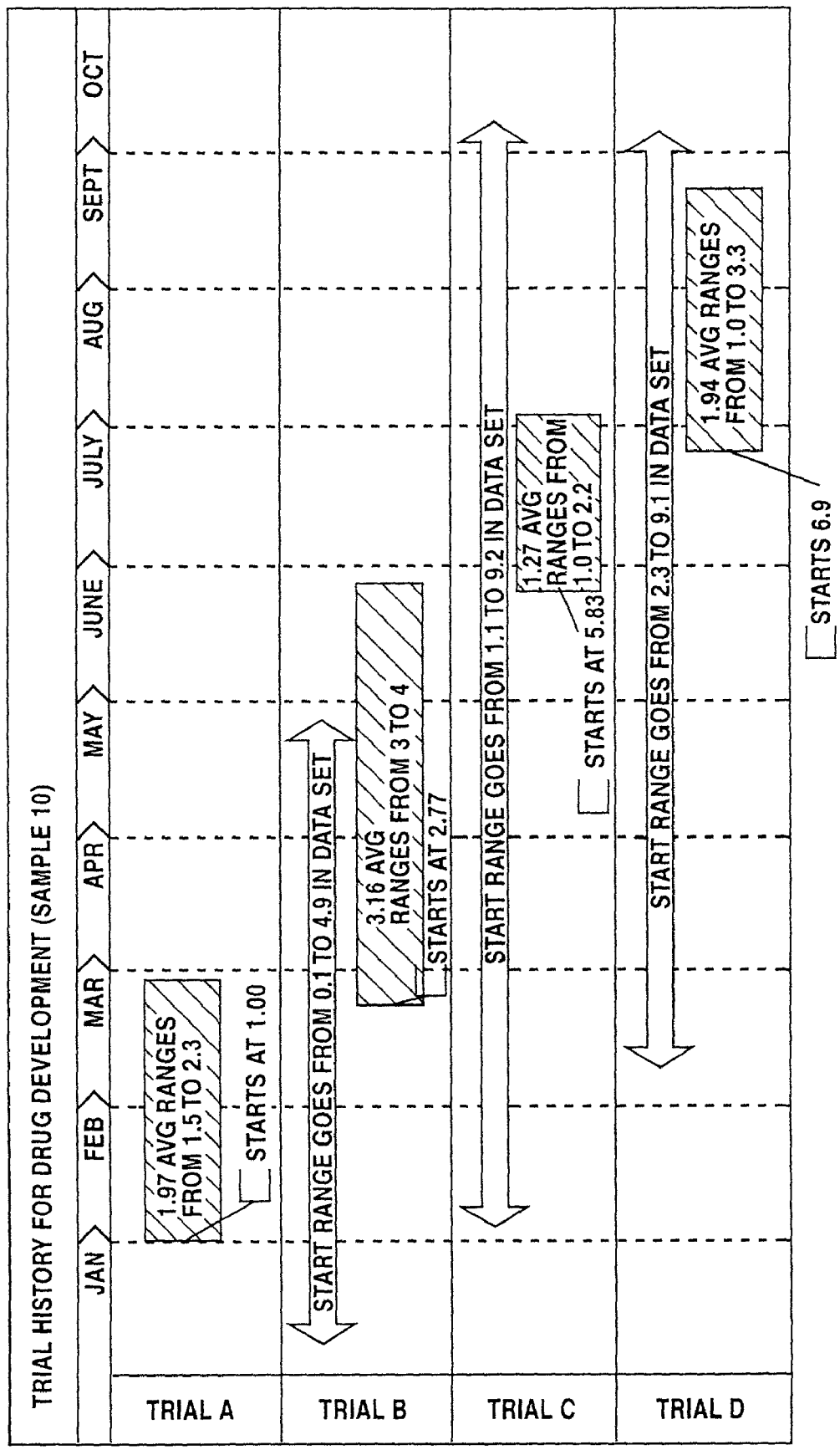
FIG. 27 is a trial history for drug development.

The average start times and durations are plotted on the chart of FIG. 27.

The output of the average return is as follows:
1. 4 trials will be preformed this year trials A, B, C, and D
2. Trial A will begin at the end of January or 1.0
   Trial B will begin at the end of March or 2.77
   Trial C will begin at the end of June or 5.83
   Trial D will begin at the end of July or 6.9

The distribution is:

| Trials | Average | Early | Late |
|---|---|---|---|
| Trial A* | End of January or 1.0 | 1 | 1 |
| Trial B | End of March or 2.77 | Beginning of Jan or .1 | End of April or 4.9 |
| Trial C | End of June or 5.83 | Beginning of Feb or 1.1 | Beginning of Oct or 9.2 |
| Trial D | End of July or 6.9 | Beginning of Mar or 2.3 | Beginning of Oct or 9.1 |

*NOTE:
The example has been adjusted for all Trial A's to begin at the same time.

Although the trials are not dependent upon each other, A will tend to start before B; B will tend to start before C; and C will tend to start before D. The true ordering may vary greatly based on the NCE, the resources, or the trial itself Therefore, it is better to plan for the trials independently using the start dates and the durations instead of a trigger from a previous trial.

4. Trial A take 1.97 months
   Trial B take 3.16 months
   Trial C take 1.27 months
   Trial D take 1.94 months The distribution in months is:

| Trials | Average | Shortest | Longest |
|---|---|---|---|
| Trial A | 1.97 | 1.5 | 2.3 |
| Trial B | 3.16 | 3 | 4 |
| Trial C | 1.27 | 1.0 | 2.2 |
| Trial D | 1.94 | 1.0 | 3.3 |

Analysis and Feedback

The pharmaceutical company can use the variation of start dates and durations to make financial and time forecasts. If the company is conservative or aggressive with a high priority product, the company will choose to plan to start the projects early—understanding using resources for this project to begin earlier will pull resources off of another project and affect the completion time accordingly.

The pharmaceutical company may not have the required funds for this project. They may decide to wait until the later part to start the trials. This will free up resources for higher priority projects, without affecting the completed drug development date by too great an extent. The company will attempt to stay within the range of trial beginning dates as to not upset the balance between trials' historical timing and results

Example 2

The Priority of Entities, or Projects, against One another

Model Description for the Example:

Process description within the company: Software Development

Flow for the Process: Development

Case Study:

A software company is attempting to decide on which projects upon which to focus. The development group has a selection of products that might be developed. This model describes the iterative learning process that takes place over 2 years.

Projects up for Consideration:
  Project A
  Project B
  Project C

The levels refer to the entity prioritization levels. The selection criteria for each project is as follows:

---

The levels refer to the entity prioritization levels. The selection criteria for each project is as follows:

Level II:

1. Has this type of product been successful?
2. Is it successful in new industries our company is interested in?
3. What is the profit margin on these types of projects over the past 3 years?
4. Will this increase our market share with a high number of sales over a short period of time?
5. Were there many problems associated with development? Are they avoidable this time?

---

Level III:

1. Does this project align with analyst projections for the selected target industries?
2. What is the projected market cap on this type of software?
3. Who are our potential competitors? Factors to consider: leaders in the industry, financial stability, innovation capabilities
4. What are the "hidden risks" in development? Can these be identified and mitigated?

1 is the lowest
5 is the highest

---

| Weights | | Risks | Opportunities |
|---|---|---|---|
| | 1998 Project A | | |
| 1.0 | Level II | | |
| | 1 | | 4 |
| | 2 | 2 | 3 |
| | 3 | 1 | 2 |
| | 4 | 3 | 1 |
| | 5 | 2 | |
| | avg | 8 | 10 |
| 0.75 | Level III | | |
| | 1 | 5 | |
| | 2 | | 4 |
| | 3 | 4 | |
| | 4 | 3 | |
| | | 5.25 | 6.75 |
| | Total | 13.25 | 16.75 |
| | 1998 Project B | | |
| 1.0 | Level II | | |
| | 1 | 3 | 2 |
| | 2 | 4 | 3 |
| | 3 | 5 | 2 |
| | 4 | 1 | 5 |
| | 5 | 1 | 3 |
| | avg | 14 | 15 |
| 0.75 | Level III | | |
| | 1 | | 2 |
| | 2 | | 3 |
| | 3 | 2 | |
| | 4 | 1 | 3 |
| | | 2.25 | 6 |
| | Total | 16.25 | 21 |
| | 1998 Project C | | |
| 1.0 | Level II | | |
| | 1 | 4 | 2 |
| | 2 | | 5 |
| | 3 | 4 | 1 |
| | 4 | 3 | 4 |
| | 5 | 4 | |
| | avg | 15 | 12 |
| 0.75 | Level III | | |
| | 1 | 2 | 3 |
| | 2 | 1 | 3 |
| | 3 | 1 | 3 |
| | 4 | 5 | |
| | | 6.75 | 6.75 |
| | Total | 21.75 | 18.75 |

Figure 28:
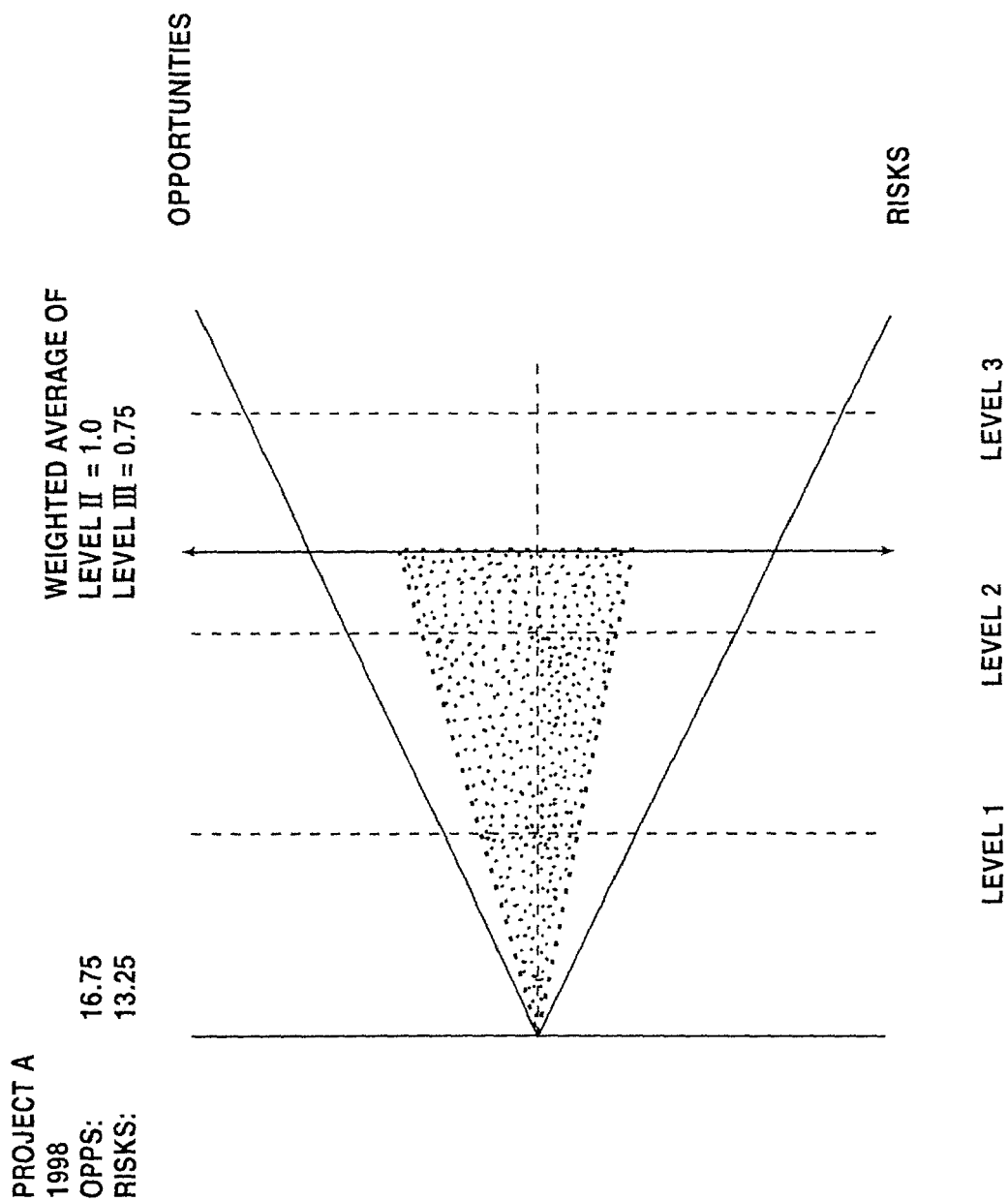
FIG. 28 is a graph of the Level II and Level III weighted average of risks and opportunities for Project A in 1998.
Figure 29:
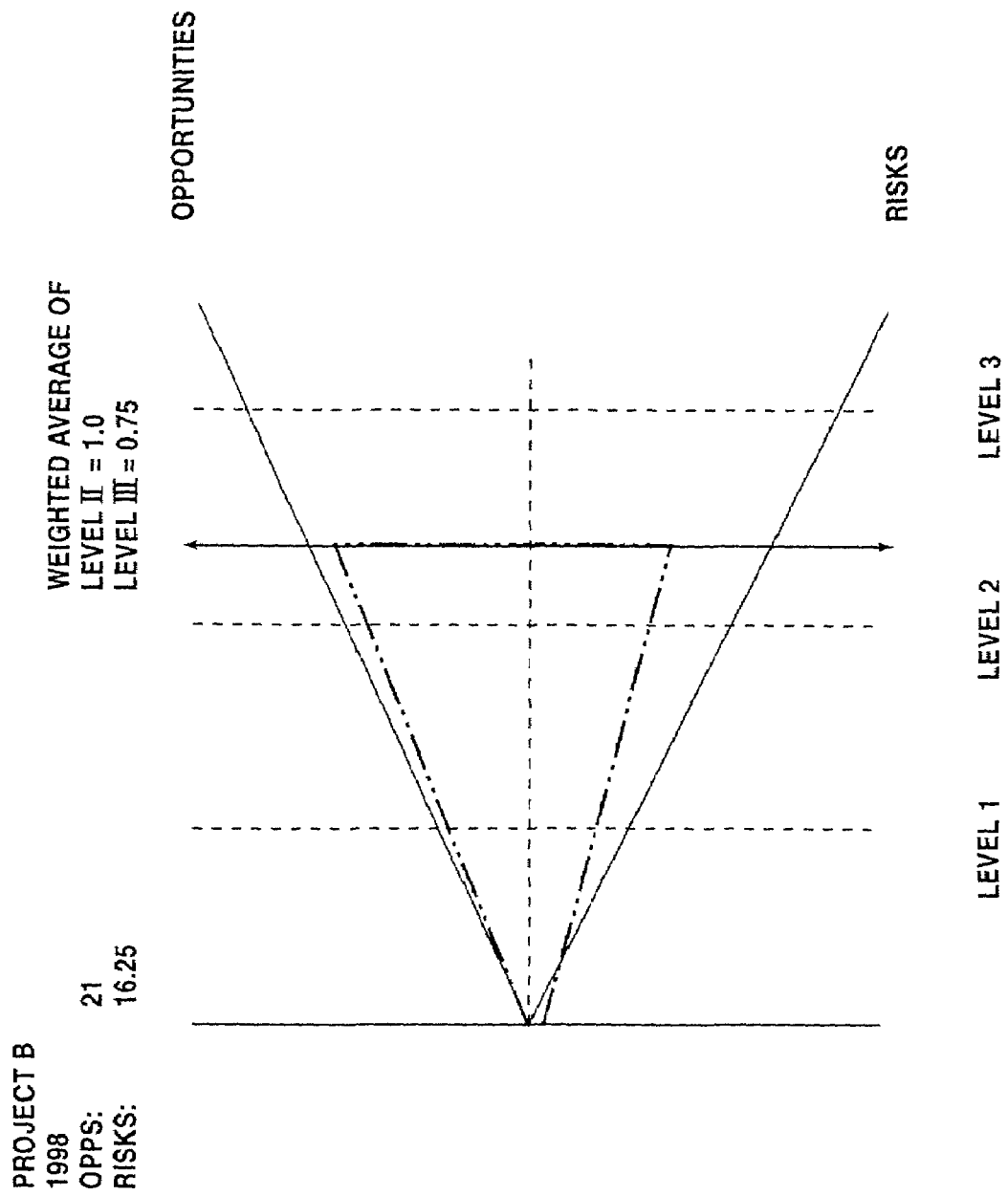
FIG. 29 is the graph of the Level II and Level III weighted average of risks and opportunities for Project B in 1998.
Figure 30:
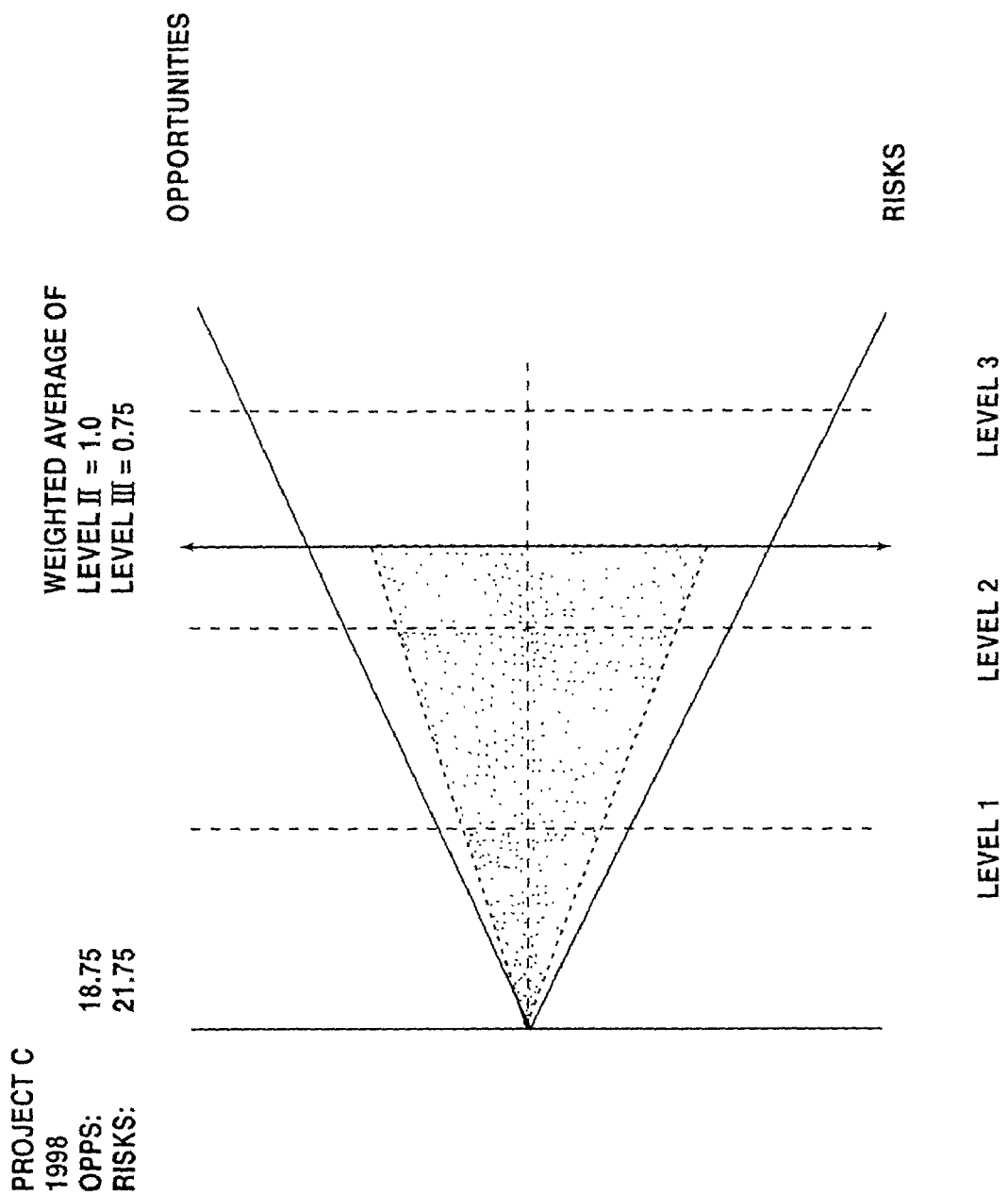
FIG. 30 is the graph of the Level II and Level III weighted average of risks and opportunities for Project C in 1998.
Figure 31:
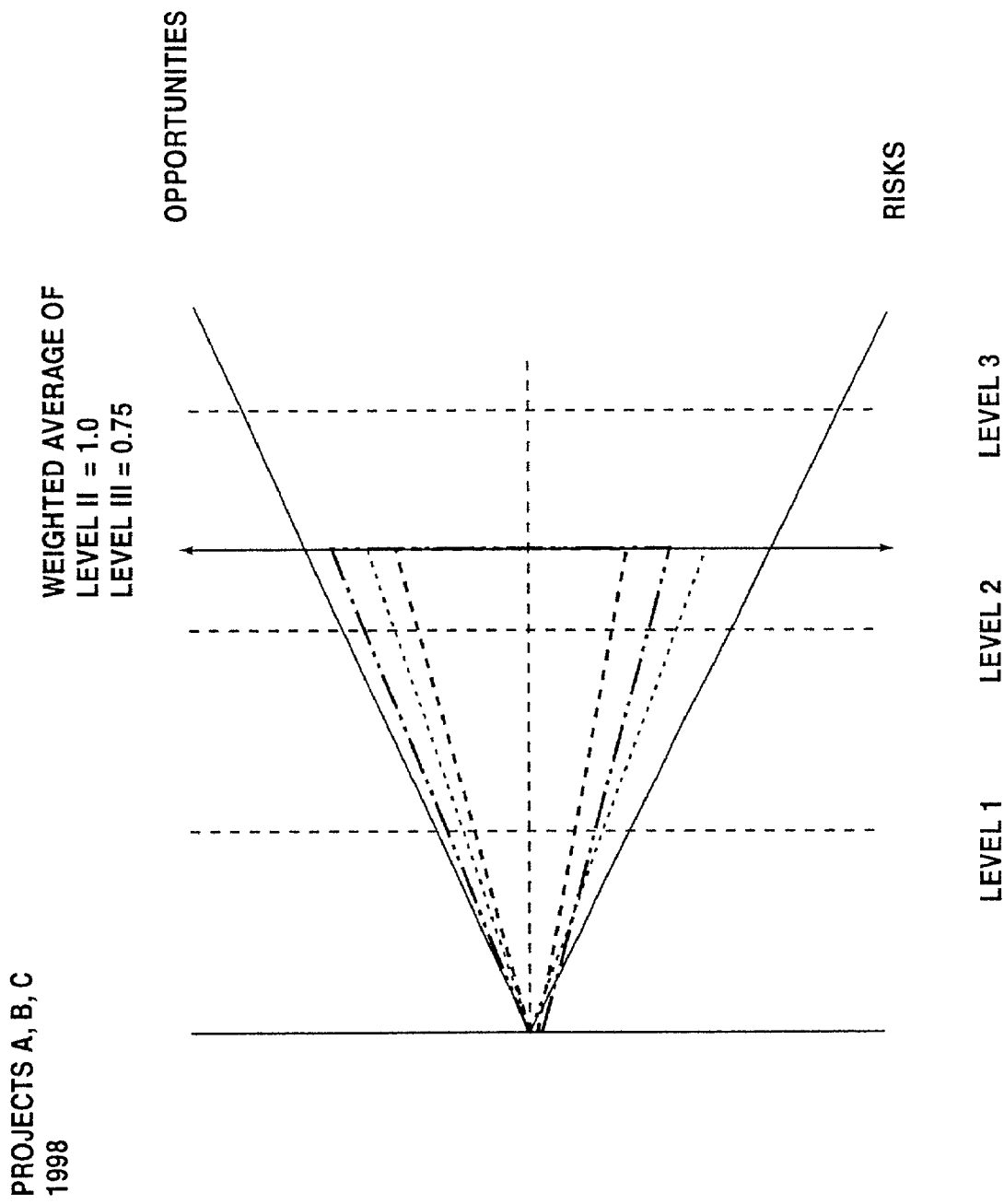
FIG. 31 is the combined graph of FIGS. 28–30.

The weighted average of Level II and Level III risks and opportunities data of Project A, B, and C for 1998 above is plotted in FIG. 28, FIG. 29, and FIG. 30, respectively. FIG. 31 is a combined plot of all three projects shown on the same graph. FIG. 31 allows one to compare the risks and opportunities associated with all three projects.

The software company is going to prioritize the projects with the highest opportunities and lowest risks first. Then, depending on how risk adverse or growth focused the company is will rank the other in descending order. This company is interested more in avoiding risk than growing rapidly.

For 1998, the ordering is: Project B; Project A and Project C (FIG. 31). In other words, FIG. 31 shows that project B has the greatest opportunities associated with it and it has a risk level in between Project A and Project C. Project C has the greatest amount of risk associated with it.

For 1999, things have changed. The software company needs to focus on how the projects rank against each other and how they've changed over last years numbers.

| Weights | Risks | Opportunitis |
|---|---|---|
| | 1999 Project A | |
| 1.0 | Level II | |
| | 1 | 4 |
| | 2          1 | 3 |
| | 3 | 3 |
| | 4          2 | 3 |
| | 5          1 | 3 |
| | avg       4 | 16 |
| 0.75 | Level III | |
| | 1 | 3 |
| | 2 | 3 |
| | 3          5 | |
| | 4          2 | |
| |            5.25 | 4.5 |
| | Total    9.25 | 20.5 |
| | 1999 Project B | |
| 1.0 | Level II | |
| | 1          2 | 1 |
| | 2          4 | 3 |
| | 3          5 | 1 |
| | 4          2 | 4 |
| | 5          2 | 4 |
| | avg      15 | 13 |
| 0.75 | Level III | |
| | 1 | 2 |
| | 2 | 2 |
| | 3          2 | |
| | 4          1 | 3 |
| |            2.25 | 5.25 |
| | Total   17.25 | 18.25 |
| | 1999 Project C | |
| 1.0 | Level II | |
| | 1          3 | 2 |
| | 2          1 | 4 |
| | 3          3 | 1 |
| | 4          3 | 4 |
| | 5          4 | |
| | avg      14 | 11 |
| 0.75 | Level III | |
| | 1          2 | 4 |
| | 2          1 | 3 |
| | 3          1 | 2 |
| | 4          5 | |
| |            6.75 | 6.75 |
| | Total  20.75 | 17.75 |

Figure 32:
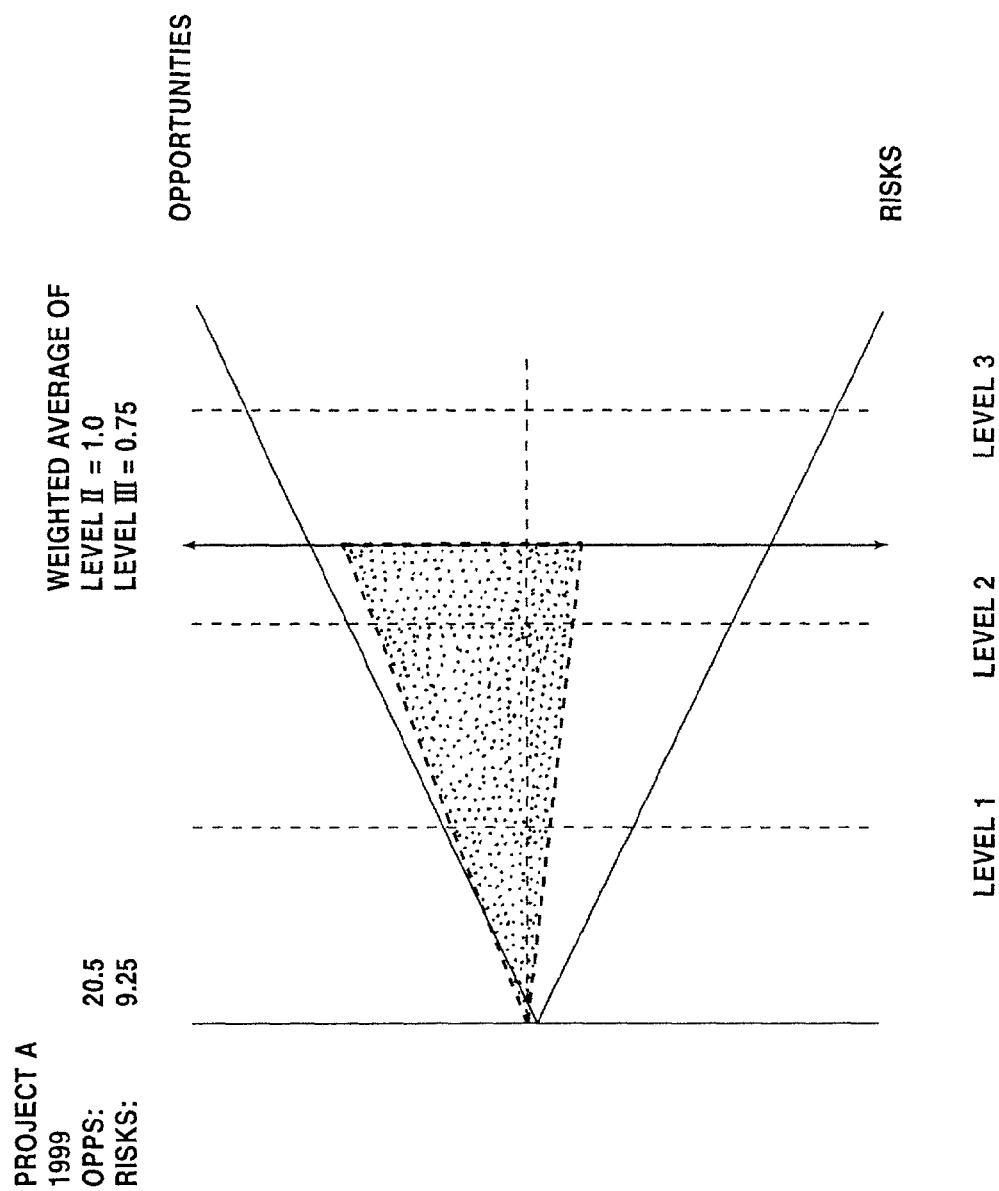
FIG. 32 is a graph of the Level II and Level III weighted average of risks and opportunities for Project A in 1999.
Figure 33:
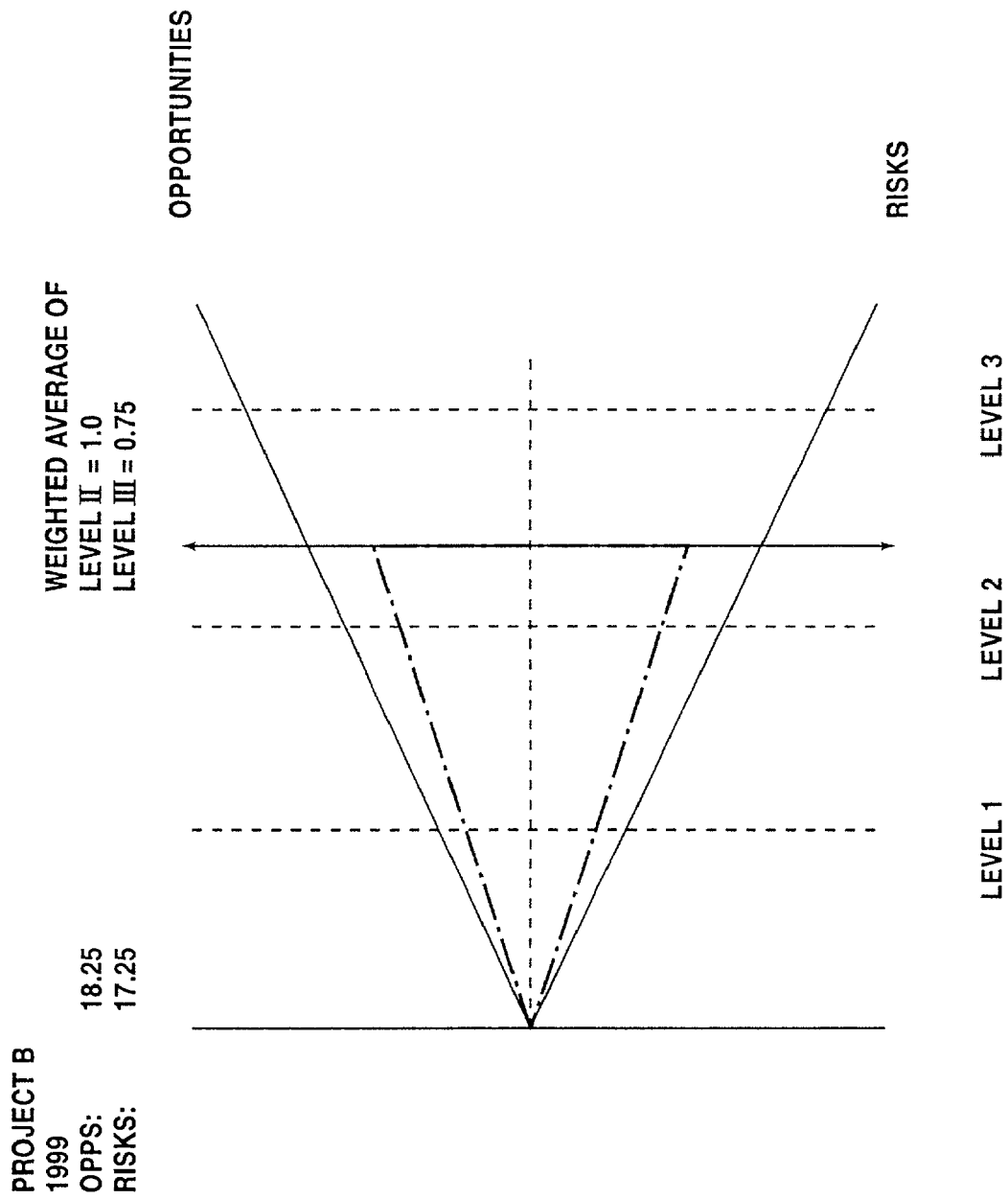
FIG. 33 is a graph of the Level II and Level III weighted average of risks and opportunities for Project B in 1999.
Figure 34:
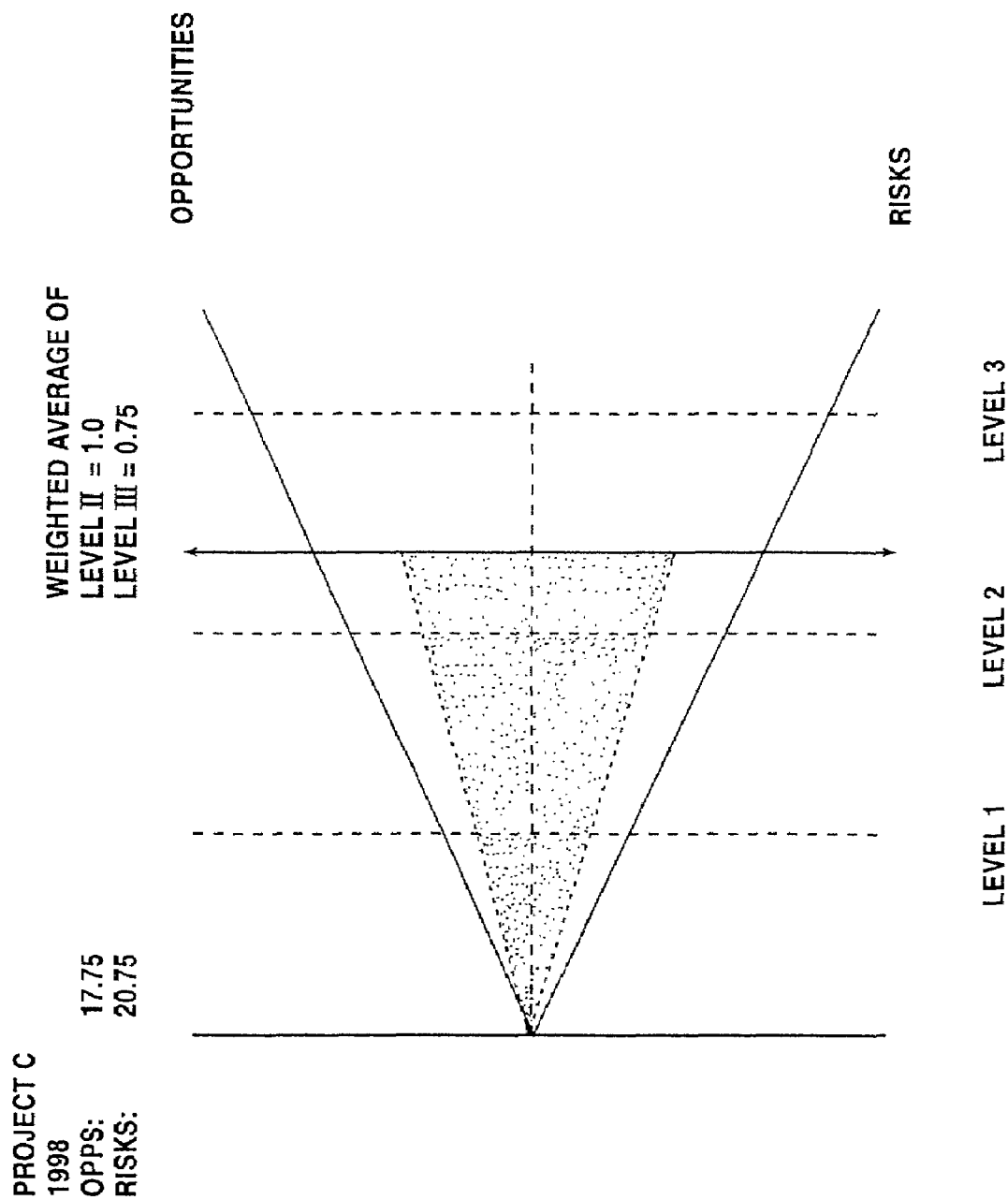
FIG. 34 is a graph of the Level II and Level III weighted average of risks and opportunities for Project C in 1999.
Figure 35:
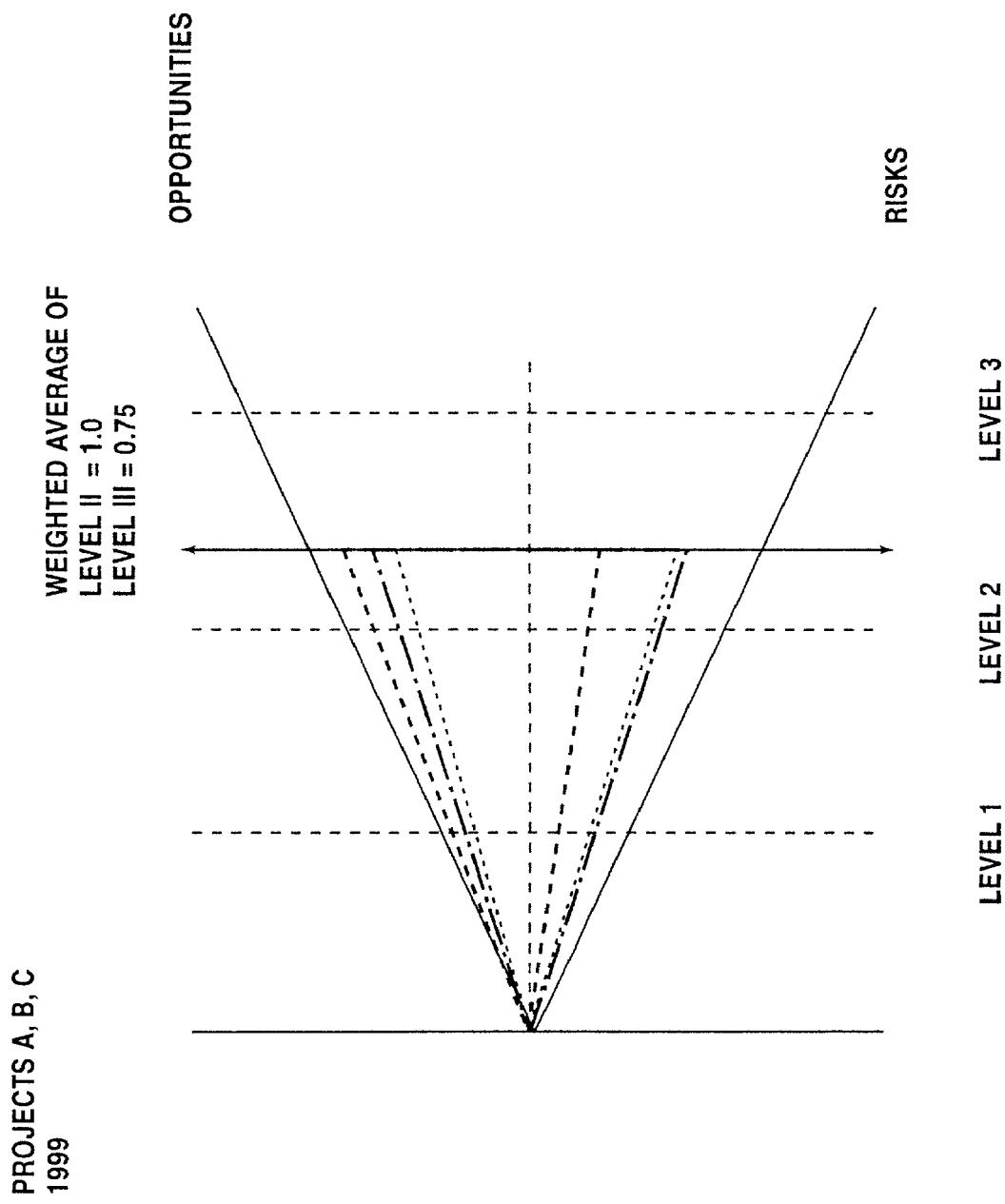
FIG. 35 is the combined graph of FIGS. 32–35.

The weighted average of Level II and Level III risks and opportunities data of Project A, B, and C for 1999 is plotted in FIG. 32, FIG. 33, and FIG. 34, respectively. FIG. 35 is a combined plot of all three projects shown on the same graph. FIG. 35 allows one to compare the risks and opportunities associated with all three projects.

For 1999, the ordering is: Project A; Project C and Project B (FIG. 35). In other words, FIG. 35 shows that Project A has the greatest opportunities associated with it as will as the lowest risk level of all the projects. Project B has the lowest opportunity level and the second highest amount of risk.

Analysis, Feedback and Selection Criteria
Business Metrics (Revenue):
1998 showed a revenue of $150M, with:
Project B=$80M
Project A=$70M
Project C=$50M
And 1999 showed a revenue of $175M, with:
Project A=$95M
Project B=$50M
Project C=$30M The software company would then analyze the data set using data mining techniques to determine which selection criteria were correlated with the business metric change.

| | Correlated with Revenue (1.0 to 0.0) |
|---|---|
| Level II: | |
| 1. Has this type of product been successful? | 0.2 |
| 2. Is it successful in new industries our company is interested in? | 0.4 |
| 3. What is the profit margin on these types of projects over the past 3 years? | 0.75 |
| 4. Will this increase our market share with a high number of sales over a short period of time? | 0.6 |
| 5. Were there many problems associated with development? Are they avoidable this time? | 0.3 |
| Level III: | |
| 1. Does this project align with analyst projections for the selected target industries? | 0.4 |
| 2. What is the projected market cap on this type of software? | 0.45 |
| 3. Who are our potential competitors? Factors to consider: leaders in the industry, financial stability, innovation capabilities | 0.6 |
| 4. What are the "hidden risks" in development? Can these be identified and mitigated? | 0.3 |

The company now has a few business decisions to make. Any of these solutions is positive.

Weight the selection criteria in the analysis relative to the correlation factor to the business metric. Determine new selection criteria with higher correlation factors.

Only use highly correlated selection criteria to analyze project scenarios.

Example 3

The Selection of Resources Based on Historical Performance

Model Description for the Example:
Process description within the company: Consulting Organization
Flow for the Process: Project Case Study:

A consulting organization is selecting resources for a project Project 1. There are 30,000 resources available but only 10 meet the selection criteria. All salaries are within the same range so cost is not a factor in the evaluation. All preferred metrics are measured at one level below the level of the project.

Years experience: 10
Education level: BS minimum
Special skills: Java coding, business process analysis
Location: USA
Performance on cost*: min 3
Performance on time*: min 2

*NOTE: performance numbers are based on previous work. Performance numbers are based on the sum total of all individual jobs. 5 meeting or exceeding cost or time requirements, to, 1 not meeting cost or time requirements.

| years experience | rank |
|---|---|
| 10 | 3 |
| 12 | 4 |
| 15+ | 5 |
| education | |
| BS | 3 |
| MS+ | 4 |

Project 1

Years experience: 10
Education level: BS minimum
Special skills: Java coding, business process analysis
Location: US
Performance on cost: min 3
Performance on time: min 2

| level 1 to 5 - 5 being highest | 1 | 2 | 3 | 4 | 5 |
|---|---|---|---|---|---|
| years exp 3 | | 3 | 4 | 5 | 3 |
| education 4 | | 3 | 3 | 4 | 3 |
| special skills 4 | | 2 | 4 | 4 | 2 |
| performance on cost 5 | | 3 | 4 | 3 | 3 |
| performance on time 5 | | 3 | 5 | 3 | 3 |
| | 21 | 14 | 20 | 19 | 14 |

Resources 1, 3, and 4 are selected for Project 1.

For Project 2 all resources are reevaluated. The new performance and any additional training or years experience has been added.

Project 2

Years experience: 10
Education level: BS minimum
Special skills: Java coding, business process analysis
Location: US
Performance on cost: min 3
Performance on time: min 2

| level 1 to 5 - 5 being highest | 1 | 2 | 3 | 4 | 5 |
|---|---|---|---|---|---|
| years exp 3 | | 4 | 4 | 5 | 4 |
| education 4 | | 3 | 3 | 4 | 4 |
| special skills 4 | | 3 | 4 | 4 | 3 |
| performance on cost 2 | | 4 | 4 | 2 | 5 |
| performance on time 2 | | 4 | 4 | 2 | 5 |
| | 15 | 18 | 19 | 17 | 21 |

Resources 2, 3, and 5 are selected.

Analysis, Feedback and Selection Criteria

Profit numbers for the organization are collected for all projects. The company has decided to heavily weight years experience as a selection criteria. Profits and years experience turn out to be negatively correlated. However, customer satisfaction with quality levels is positively correlated with years experience. Therefore, the company decides to continue to use years experience as a selection criteria for resources.

A company more concerned with profits, or, that deals with low profit margin types of contracts, will tend to use less experienced, less educated resources to reduce overhead and increase profits. This type of company would tend to not use these selection criteria—opting for performance of cost and time metrics over years experience or education.

Decision Dynamics System Architecture

Because projects that consume a lot of resources in many different physical locations it becomes necessary to collect data about jobs performed in many different physical locations. In order to use complete information collected by the method of the invention it is necessary to centralize all of the collected information otherwise an evaluation of an entire project cannot be accurately made. Since the preferred method for implementing the system of the invention is a computer program, a central server host computer housing the computer program and all necessary hardware for its operation is the means for establishing a unitary closed loop centralized system for the present invention. The central server host computer is one component of the architecture necessary for the present invention. The central server host computer houses the computer program which performs the functions or steps of the present invention.

A signal means, such as e-mail, is another component of the architecture of the present invention. The computer program which implements the present invention signals an individual performing an individual job or task in the project for an action by sending the individual a signal which requires a response from the individual. The signal can be in the form of an e-mail such as a reminder or an e-mail questionnaire requiring the input of specific information in response in order for the individual to advance the performance of the job.

The computer program of the present invention can make the signal means, such as e-mail, to be automatic and continuous. The e-mail can automatically be sent at specifically defined time intervals over a period of time.

The signal or e-mail can operate as a true push system requiring input by an individual performing a job before the network allows continued access by the individual. In other words, a signal is sent to an individual which prompts the individual to input data, however defined, about the success or failure of that particular job. The computer program can prompt the individual to enter in complete data in response to the signal with the consequence that incomplete data entry prompts a second and third signal from the system or no input of data prompts the system to log off the user until data points are entered and received by the system. In this way, a system operates automatically and continuously to collect data about any job performed by any individual at any level of the organization.

A network means is a further component of the architecture of the present invention. The network means such as the Internet allows the central server host computer to function automatically and continuously at any geographic location. The network is necessary as the means for which data and signals are transmitted between an individual performing a job and the computer program implementing the process of the invention.

Figure 36:
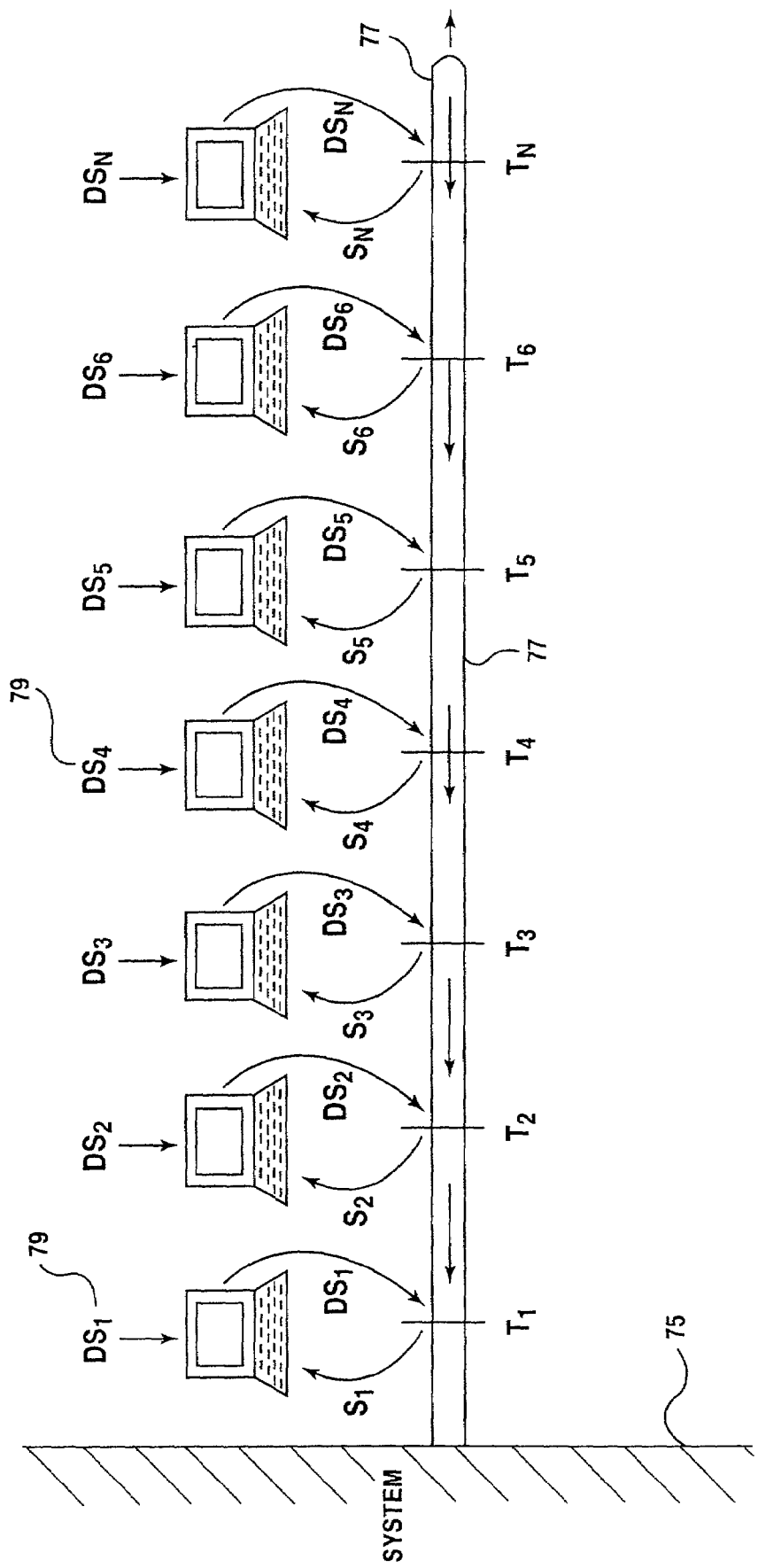
FIG. 36 is a schematic diagram of the data collection means of the present invention.
Figure 37:
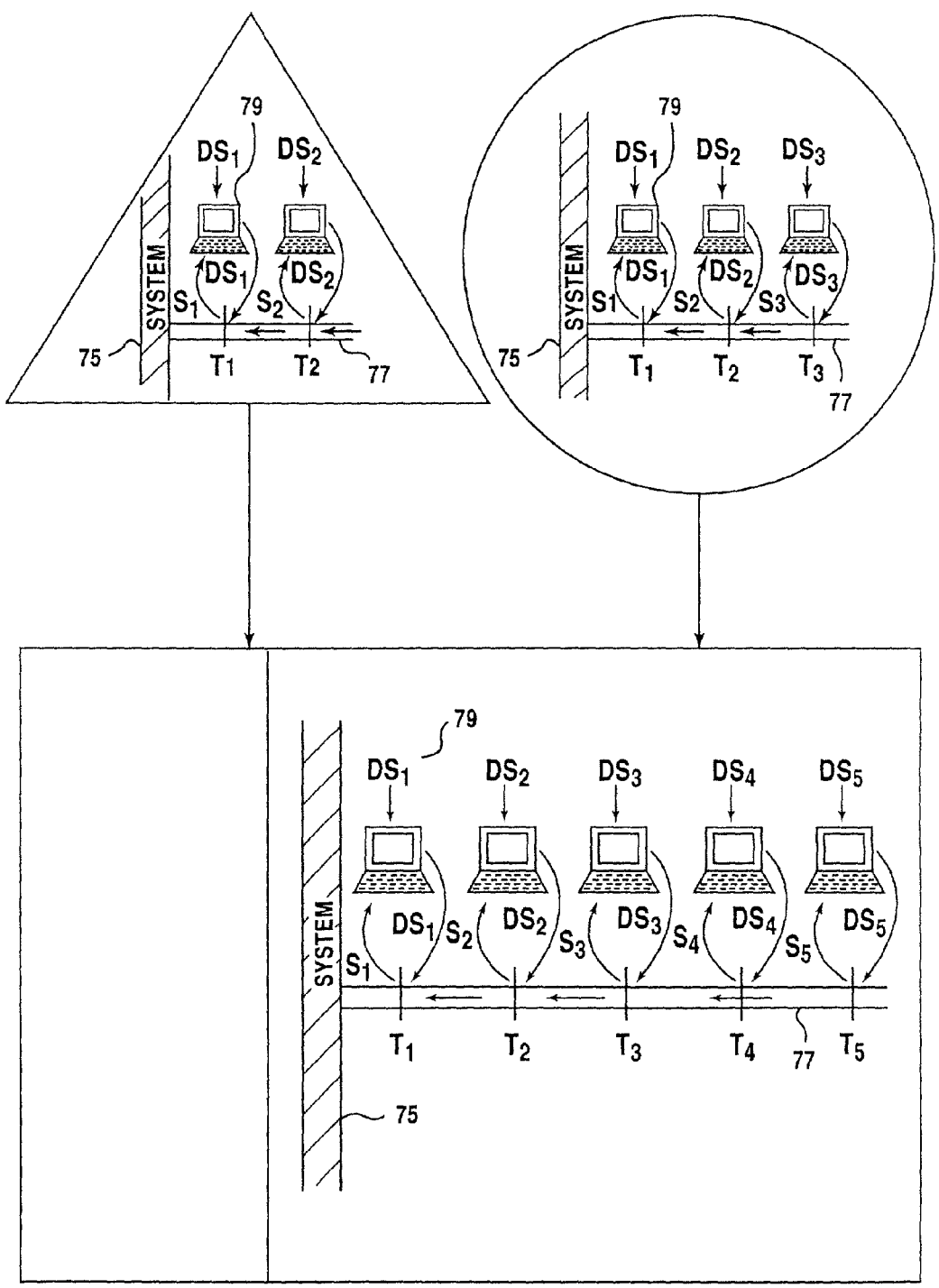
FIG. 37 is a schematic diagram of the data collection means of the present invention as illustrated for a scheduling driver, an operations driver and an activity.

An interface between and individual performing a job and the computer program of the present invention is still another component of the process architecture. The interface is necessary as a communication means between the computer, using computer language, and an individual using English or any other language. Preferably, the interface is a world wide web based interface accessible anywhere on the network means. Referring now to FIGS. 36 and 37 the schematic drawing shows the main architectural elements of the system of the invention. FIGS. 36 and 37 show a central server host computer 75 as the system on the left (FIG. 37 shows the system diagramed into an activity and its drivers). A network 77 is connected to the host system and as indicated by the horizontal bar extending from the system. The horizontal bar having a series of computers above the bar is a schematic representation of an individual job in a project.

An individual job begins at an initial time $T_0$ and continues into the future indicated at $T_N$ to a final finish time. Individual time periods are indicated during the total time of the particular job. At each individual time period the computer program running on the central host system sends a signal indicated by S to a remote computer of the individual performing the particular job. The signal, $S_1$, requires the input from the user of a data set, $DS_1$, which quantitatively defines the success or failure of the particular job at $T_1$. $DS_1$ is entered by the individual into a remote computer via an interface (not shown) and is sent through the network 77 to the host system 75 where it is stored in a data base (not shown).

As the job progresses in time to $T_2$ a second signal $S_2$, a major component of the system architecture, is sent to a remote computer prompting the entering of the second data set, $DS_2$. Once $DS_2$ is entered into the computer via the interface, $DS_2$ is sent via the network 77 to the server host system 75 and stored in the centralized data base (not shown). As shown in FIGS. 27 at each specifically defined time interval a signal is sent from the server host computer 75 and a data set is received in response. Therefore, the job becomes quantifiable by $DS_{1-N}$ over time $T_{1-N}$. FIG. 27 represents the main architecture needed for a single job in a larger project.

Continuous and Automatic Data Collection

Data can be collected by the process of the invention continuously and automatically over the length of a individual job. The continuous and automatic data collection of the present process is different from merely collecting data from other remote data bases at repeating intervals of time. The present process is not inclusive of the blind capturing of pre-entered data or information from other information sources. Rather, the claimed process collects specific data from individuals performing the jobs necessary to complete the project.

The continuous and automatic collection of data can be described with reference to FIG. 36, a single job performed over a time period defined by $T_0$ to $T_N$. As an example, the particular job schematically represented by FIG. 36 can be an operations level job of testing the effect of a prototype drug on the liver cells of laboratory animals.

The process of the present invention is started as follows: The collection of data by the process can be initiated by either the individual performing the job or the computer program implementing the process itself. The computer program can be programmed to initiate the collection of data based upon a preprogrammed schedule.

The initiation of the data collection process begins with the opening of a "ticket." The opening of a ticket informs the central server host computer 75 that an individual job has started and will be performed over a time period. A single ticket corresponds to a single job performed by an individual. A ticket is merely the bookkeeping means by the computer to identify and follow a job being performed.

Once the ticket is opened and all relevant background information has been input into the computer and associated with the new ticket, the process of the present invention begins. At a first time interval indicated by $T_1$ in FIG. 36 a signal $S_1$ is sent by the host computer 75 to a remote computer 79 operated by the individual performing the job in question. The signal is received by the individual when the individual logs onto the network 77. Signal $S_1$ prompts the user to enter a first data set, $DS_1$, associated with the new ticket which corresponds to the new job.

$DS_1$ is the quantitative description of the success or failure, risk/opportunity, or performance monitoring of the job at or up until the first time period, $T_1$. The individual performing the job communicates with the computer program (not shown) via the interface on the remote computer 79 connected to the network. The interface, which will be described later, is customized for the particular job in question allowing for the efficient collection of information comprising $DS_1$.

Once $DS_1$ has been entered through the interface in response to $S_1$ it is transmitted via the network to a data base on the host computer. $DS_1$ is always associated with the ticket assigned to the particular job. By this means the computer keeps track of which data sets belong to which tickets and which jobs.

The job continues until the second time interval, $T_2$, is reached, whereby a signal $S_2$ is sent to the individual performing the job. Signal $S_2$ is received when the individual logs onto the network 77 whereby the individual is prompted to input the second data set, $DS_2$ via the interface into the remote computer 79. Once $DS_2$ is entered it is transferred by the network to the data base of the host computer. The collection of data by the process of the invention is automated by the automatic transmission of signals, such as e-mail, to individuals performing jobs at specific time intervals. The signals require a response in the form of a data set to be entered into the system. Therefore, at any time during the performance of the job there will be data collected which quantifies the success or failure of the particular job. As will be described later, this information can be accessed and analyzed by individuals at the same or higher levels in the corporation.

The present process tracks and monitors data for individual jobs by collecting data sets at specific time intervals during the job. All the data sets are organized and associated with the ticket corresponding to the particular job. The continuous collection of data, which can be simply referred to as data tracking over time, allows for job and project evaluation at any time during the on-going project. This is completely different than selected information collected about projects from budget histories or information snap shots of the system. Instead, the data tracking presents an evolving quantitative evaluation of the project.

Data tracking continues to the end of the job. When the job reaches its finishing point at $T_{FINISH}$, a final signal $S_{FINISH}$ is sent to the individual requiring the input of $DS_{FINISH}$. $DS_{FINISH}$ is the data set of the final time period of the job. Upon the entering of the final data set the ticket is closed and the host computer 75 stores the information and closes the ticket. Once the ticket is closed the system will no longer automatically transmit signals to the individual requiring the input of additional data sets. It is by this means that data is tracked for an individual job by the process of the invention.

Data Sets and Strategic Decisions

The quantified evaluation of an entire project or sub-project will be based on all of the cumulative data sets, DS, collected by the present process. All of the data sets collected are associated with tickets assigned to each job and stored in the data base which is centralized in the server host computer 75 (FIG. 36). The present process collects data sets from jobs during the course of the job. The data sets collected reflection actual primary or raw information as opposed to information that has been filtered by other analysis means. The present process seeks to evaluate a project based on raw data from individual jobs rather than pre-entered data from other computer programs or analysis methods.

Two of the primary evaluation tools utilizing the collected data will be milestone tracking and benchmark or best practices analysis. Milestone tracking is simply monitoring a job for the completion of certain milestones or goals during the period of the job. In other words, an individual job having a single goal can be broken down into smaller subsets defined by smaller goals or milestones. An example of milestones in a construction of a building could be the completion of the 10th, 20th and 30th floors. Milestone tracking or monitoring involves the tracking and monitoring of information related to each milestone, such as the amount of capital expended to reach the milestone, time necessary to reach the milestone, etc.

Benchmark or best practices analysis is a comparison tool which compares related information of two different jobs, sub-projects or projects. For example, if two similar jobs were performed in two different laboratories in two different countries or locations within the same country, data sets can be collected in the same manner for each of the two different jobs. The process of the invention could automatically and continuously collect data sets at the same time intervals for both jobs. Anytime during the performance of the jobs the data sets for each job can be compared and used as a benchmark against each other. The comparison of the data sets can show which of the jobs performed is the actual best practice or most efficient in terms of time and resources consumed.

Now that two primary purposes of the data collected have been described, the actual data collected will be explained. First, the data collected is organized into categories of data based upon the type of data being collected. For example, one category of data relates to the risks/opportunities inherent in a particular job. A second type of data collected relates to the measuring of performance or performance metrics inherent in the particular job. A third type of data collected can be information about the static qualities of the job, like sunk costs and resources already expended.

For the risks/opportunities category of information, the data sets to be collected will be data that quantifies either the risk of the job or opportunities available for the job. Risks for individual jobs are individual defined depending on the job. For example, in a manufacturing scenario a risk for manufacturing a product can be the product defect rate during manufacturing. This product defect rate information can be collected at specific time intervals during the performance of the job. If the product defect rate increases then this will be reflected in the data set and can be interpreted as an increased risk for that particular job.

Opportunity information is defined similarly to risk information. Opportunity data to be collected could be information on potential sales, potential discovery of new resources, or the lowering of a defect product rate during manufacturing. Both risk and opportunity data must be collected in order to evaluate the potential risk or potential opportunity of any given job. Risk and opportunity data will be individually defined for individual jobs and will likely be different depending on the particular industry.

A second category of information to be collected is performance metric data. Performance metric data is primarily data concerned with time, cost and quality. Such data continuously and automatically collected during an on-going job is useful for evaluating many aspects of a particular job, sub-project or project. For example, the data can be used to identify the best practice or worse practice job within the project, budget estimations, performance and capacity summaries, return on investment and the data can be used over time for trend analysis.

Collecting risk and opportunity information and performance metric information automatically and continuously during the length of a project is significant more valuable then any type of snap shot information collected at the end of a job. Only by developing a push system to collect this type of data can accurate strategic decisions be made.

General Process Example for Collecting Data

The following show a more detailed example of the steps of the present process for collecting and evaluating performance and risk/opportunity information.

Performance Tracking Example

I. Begin Process or Sub Process
  a. A project lead (A) will complete the "project initiation" information about a process into the database.
  b. The database will send a notification to the process lead (B) and to any other required people (B).

II. Tracking Process or Sub Process
  a. A reminder (C) for a periodic update will be sent to the process director (A).

b. The process director (A) will follow the link in the e-mail reminder to the database and complete the update questionnaire.
c. The database will send an update to required people (B).
d. The information will be added to the periodic reports.
e. Periodic reports are sent to required personnel. (B)

III. Closing Process
  a. A reminder (C) for a periodic update will be sent to the process director (A).
  b. The process director (A) will follow the link in the e-mail reminder to the database and complete the update questionnaire.
  c. The process director (A) may be asked to complete a quality questionnaire.
  d. The database will send an update to required people (B).
  e. The information will be added to the periodic reports.
  f. Periodic reports are sent to required personnel. (B)

Risks/Opportunities Tracking Example

I. Begin Risk Opportunities
  a. A project lead, process lead, marketing representative, etc. (A) will complete the "risks/opportunities initiation" information about a project or process into the database.
  b. The database will send a notification to the project lead (B), to the Point of Contact (or data entry person) (B) and to any other required people (B).

II. Tracking Process or Sub Process
  a. A reminder (C) for a periodic update will be sent to the Point of Contact (A).
  b. The Point of Contact (A) will follow the link in the e-mail reminder to the database and complete the update questionnaire.
  c. The database will send an update to required people (B).
  d. The information will be added to the periodic reports.
  e. Periodic reports are sent to required personnel. (B)

III. Closing Process
  a. A reminder (C) for a periodic update will be sent to the Point of Contact (A).
  b. The Point of Contact (A) will follow the link in the e-mail reminder to the database and complete the update questionnaire.
  c. The database will send an update to required people (B).
  d. The information will be added to the periodic reports.
  e. Periodic reports are sent to required personnel. (B)

Decision Dynamics Method Overview

A. Determine System Goals

The first step is to determine the goal of the system. All organizations have goals or purposes for existence. Although the goal of a pharmaceutical company is to produce drugs, the true goal of all business systems is profit. The goal of governmental systems is to perform specified tasks optimally. The goal may change within an industry or an organization, depending on the detail level of the system. (i.e. management board, division directors, project managers, etc)

B. Determine Metrics to Measure Goals

Creating valuable metrics that truly measure the performance of a goal is the second step in the process. Metrics allow measurement of the goals. Determination of valuable metrics is a critical step towards understanding the progress of an organization. Tracking metrics leads to greater system understanding.

C. Determine Drivers to the Metrics

We use the 5 flow categories to determine the dynamics associated with a particular system. We then associate the drivers with the system metrics. Please refer to the previous section for greater detail.

D. Create Monitoring System for the Metrics [associated with Collection System]

Performance monitoring tracks metrics associated with the goals of the organization. We utilize a tracking database system over the web to cross company, software, and location boundaries over time. This system gives us the required flexibility to collect all information from any location, company, or person as long as they have access to a computer and the web.

E. Create Monitoring System for the Drivers [Associated with Collection System]

Monitoring the drivers give real time valuable information around the most influential aspects of an organization. This information can be used to re-allocate and re-optimize system performance at anytime.

F. Analyze and Store Information from Both Monitoring Systems [Associated with Collection System]

Real time monitoring information and periodic reports are stored for further analysis. This information can be studied to determine trends, changes, extreme events, and possible correlations to these events.

G. Query and Analyze Long Term Data from Systems to Determine:

1. Dynamics of metrics [Associated with Collection System]

Performance information stored over time can give return on investment information by measuring cost/time/quality/performance metrics against each other at different points in time. Budgeting estimates for projects or operations can be made based on an accumulation of historical performance across multiple resources and multiple projects. Best practice/worst practice identification across an organization and it's business partners can focus improvement efforts where they are needed most. Contractor/team selection for projects or operations can be based on historical cost/time/quality information and performance metrics.

2. Dynamics of Drivers and Effecter and the Affects on Metrics [Associated with Collection System]

Monitoring drivers over time collects information that can give valuable insight to the dynamics, and ultimately the effectors on the drivers of a system. Data mining on metrics and driver dynamics correlates performance and driver changes. Further study into driver and effecter dynamics correlates changes in outside events that have an affect of the goals of the system. Adjusting these effecters allows for improvement of drivers and ultimately system metrics. Return on investment around these adjustments is easily measured with performance monitoring.

Reporting and Queries

Because the present invention continuously and automatically collects metric, risk and opportunity data over time, this information may be organized into reports viewable at any time during the individual activity or larger process. Different reporting features are available to individuals on different levels of an organization. For example, individuals at the top of an organization will be able to see overall company performance reports which are summaries of the metrics of every single activity measured in an entire process and reported in terms of the single company performance. This type of reporting provides the most current information about a company's health.

Individuals at the operations level of an organization will have access to specific reports concerning the specific activity they are working on or supervising. This type of reporting gives the individual a performance report on the specific activity. While the individuals at the operations level of an organization will not have access to reports concerning the overall company performance, they will be able to access all of the information they need.

By using the web interface and HTML language, the reports can be organized to provide overview or summary reports followed by reports of increased detail. For example, a person at the top of an organization will have access to company performance reports and will be able to "drill-down" through the company performance or summary reports to find out more specific detailed information. Ultimately, one at the top of an organization would be able to drill-down to the who, what, when, where and why information for every specific activity the company has engaged in. Because this type of detailed information is typically not relevant for upper management in making decisions about the direction of the company, the specific information will only be available by drilling-down to that specific level of information.

Metric, risk and opportunity information may be accumulated for every single individual activity and the metrics, risk and opportunity information for all activities may be summarized into a company performance report.

In order to make further more detailed information easily accessible, the bars in the bar graph of the company performance chart would be an HTML link to more detailed information about the particular project represented by the bar. For example, the manufacturing bar shown in white is, in fact, comprised of a summary of all of the metric data for all of the activities of that particular manufacturing project. By clicking on the particular bar in the summary chart, one would be able to obtain more detailed information for that particular quarter for the manufacturing project. Ultimately, one would be able to drill-down to find how many and what particular activities comprise the manufacturing project of that company. The who, what, when, where and why information for each activity would be available by calling up the information relevant to the particular activity.

Historical reporting is also another feature of the present invention. Because information is collected continuously and automatically over the course of an entire process, the information is for comparison purposes with other processes. Therefore, all of the charts available during the time of the process are also available as historical information after the process and particular project of the company is completed.

Below is a summary of several of the types of reports available at different levels of the company for different types of reports and information.

Reporting and Query Example

I. Periodic Reporting
A. Reports for Risk/Opportunities
  i) Level 1
    (1) Go/No Go decision
    (2) Priority decision
  ii) Level 2
    (1) Division risk summary
    (2) Project risk summary
  iii) Level 3
    (1) Process Summary in Questionnaire
B. Reports for Performance Monitoring
  i) Level 1
    (1) Summary of projected time changes (including details by project and process)
    (2) Summary of projected cost changes (including details by project and process)
  ii) Level 2
    (1) Division time changes
    (2) Division cost changes
    (3) High risk processes for time/cost overrun (by division)
    (4) Project time changes (including details by process)
    (5) Project cost changes (including details by process)
    (6) High risk processes for time/cost overrun (by project)
  iii) Level 3
    (1) Process Summary in Questionnaire II. Annual Reporting
A. Reports for Risks/Opportunities
  i) Level 1
    (1) Project Summary (risks and opportunities)
  ii) Level 2
    (1) Division Summary (risks and opportunities)
  iii) Level 3
    (1) Process Summary (risks and opportunities)
B. Reports for Performance Monitoring
  i) Level 1
    (1) Best Practice/worst practice identification (corporate wide)
    (2) Budget estimations/multiple optimal solutions (corporate wide)
    (3) Capacity analysis (corporate wide)
    (4) Performance summary (corporate wide)
  ii) Level 2
    (1) Best Practice/worst practice identification (division wide)
    (2) Budget estimations/multiple optimal solutions (division/project wide)
    (3) Capacity analysis (division wide)
    (4) Performance summary (division/project wide)

III. Ad Hoc Queries
A. Reports for Risks/Opportunities
  i) Level 1
    (1) Market trend analysis
    (2) Project risk/opportunity trend analysis
  ii) Level 2
    (a) Project risk/opportunity trend analysis
B. Data Collection Elements for Risks
  i) Level 1
    (1) Trend analysis—by attribute, resource, location, process, etc. (corporate wide)
    (2) Return on Investment (corporate wide)
    (3) Combined future model projection analysis (corporate wide)
    (4) Best practice identification and cross training (corporate wide)
  ii) Level 2
    (1) Trend analysis—by attribute, resource, location, process, etc. (division/project wide)
    (2) Return on Investment (division/project wide)

(3) Combined future model projection analysis (division/project wide)

(4) Best practice identification and cross training (division/project wide)

iii) Level 3

(1) Best practice identification and cross training

While there have been illustrated and described several embodiments of the present invention, it will be apparent that various changes and modifications thereof will occur to those skilled in the art. It is intended in the appended claims to cover all such changes and modifications that fall within the true spirit and scope of the present invention.

I claim:

1. A method of controlling a process having activities to achieve desired goals, to method comprising the steps of:
providing a computer for coordinating the method steps;
mapping the activities, with each activity having a scheduling component and an operational component, based on their time scheduling relative to each other, wherein an activity map will organize activities based on the relative importance or the scheduling component versus the operational component for each activity and the relative importance of scheduling/operation is selected from the group consisting of: 80–100%/0–20%; 65–80%/20–35%; 50%/50%; 20–35%/65–80% and 0–20%/80–100%;
determining at least one scheduling driver, that which affects the start and duration of an activity, of the activities;
measuring the metrics of the at least one scheduling driver;
determining at least one operations driver, that which affects the work done by an activity, of the activities;
measuring the metrics of the at least one operations driver;
evaluating driver metric data accounting for the relative effects of the at least one scheduling driver and the at least one operations driver on the process to determine which attributes of the drivers and which drivers create a predictive equation for the response of the process; and
controlling the process by using the evaluation of the driver metrics as feedback for controlling the currently selected drivers and to predict and select new drivers, if new drivers can affect the scheduling and performance greater than the currently selected drivers, such that the desired goals of the process are achieved.

2. The method of claim 1, wherein the scheduling driver is derived by determining what one or more members of the group of attributes consisting of activities, resources, input entities, output entities and controls, most significantly affect the scheduling of activities within a process.

3. The method of claim 1, wherein driver metrics are measured by measuring the metrics of the attributes of the driver which are considered to be the selection criteria of the driver.

4. The method of claim 1, wherein the operations driver is derived by determining what one or more members of the group of attributes consisting of activities, resources, input entities, output entities and controls, most significantly affect the operation metrics of the process.

5. The method of claim 1, wherein evaluating driver metrics further comprises evaluating the driver metrics measured directly as well as evaluating the driver metrics as they relate to the metrics of the overall process.

6. The method of claim 1, wherein controlling the process is done be controlling driven which directly affect the overall process.

7. A method of controlling a process of an organization having activities to achieve desired goals, the method comprising the steps of:
providing a computer for coordinating the method steps;
mapping the activities, with each activity having a scheduling component and an operational component, based on their time scheduling relative to each other, wherein an activity map will organize activities based on the relative importance of the scheduling component versus the operational component for each activity and the relative importance of scheduling/operation is selected from the group consisting of: 80–100%/0–20%; 65–80%/20–35%; 50%/50%; 20–35%/65–80% and 0–20%/80–100%;
determining at least one scheduling driver, that which affects the start and duration of an activity, of the activities by determining what entity or entities affect the metrics of the scheduling of the activities by 50% or more;
measuring the metrics, which are time, cost and quality, of the at least one scheduling driver;
determining at least one operations driver, that which affects the work done by an activity, of the activities by determining what resource or resources affect the metrics of the operation of the activities by 50% or more;
measuring the metrics, which are time, cost and quality, of the at least one operations driver;
evaluating driver metric data accounting for the relative effects of the at least one scheduling driver and the at least one operations driver on the process to determine which attributes of the drivers and which drivers create a predictive equation for the response of the process; and
controlling the process by using the evaluation of the driver metrics as feedback for controlling the currently selected drivers, which affect the scheduling or operation of activities by 50% or more and to predict and select new drivers, if new drivers can affect the scheduling and performance greater than the currently selected drivers, such that the desired goals of the process are achieved.

8. The method of claim 7, wherein driver metrics are measured by measuring the metrics of the attributes of the driver which are considered to be the selection criteria of the driver.

9. The method of claim 7, wherein evaluating driver metrics further comprises evaluating the driver metrics measured directly as well as evaluating the driver metrics as they relate to the metrics of the overall process.

10. The method of claim 7, wherein controlling the process is done be controlling drivers which directly affect the overall process.

11. The method of claim 7, wherein the process is the dominant process of the organization.

12. The method of claim 7, wherein the method further comprises evaluating the correlation of the scheduling driver and the operations driver of a process to past performance to determine if different attributes of the scheduling driver or the operations drivers should be measured.

* * * * *